(12) United States Patent
Hershko et al.

(10) Patent No.: US 9,052,898 B2
(45) Date of Patent: Jun. 9, 2015

(54) REMOTE ACCESS AND ADMINISTRATION OF DEVICE CONTENT, WITH DEVICE POWER OPTIMIZATION, USING HTTP PROTOCOL

(75) Inventors: Yuval Corey Hershko, Haifa (IL); Nir Strauss, Yokneam Moshava (IL)

(73) Assignee: Qualcomm Incorporated, San Diego, CA (US)

( * ) Notice: Subject to any disclaimer, the term of this patent is extended or adjusted under 35 U.S.C. 154(b) by 225 days.

(21) Appl. No.: 13/601,325

(22) Filed: Aug. 31, 2012

(65) Prior Publication Data
US 2013/0047020 A1 Feb. 21, 2013

Related U.S. Application Data

(63) Continuation-in-part of application No. 13/415,636, filed on Mar. 8, 2012.

(60) Provisional application No. 61/452,031, filed on Mar. 11, 2011, provisional application No. 61/588,007, (Continued)

(51) Int. Cl.
*G06F 1/00* (2006.01)
*H04W 4/00* (2009.01)
*G06F 1/32* (2006.01)
(Continued)

(52) U.S. Cl.
CPC .............. *G06F 1/3206* (2013.01); *G06F 1/329* (2013.01); *H04W 52/0229* (2013.01); *H04W 4/02* (2013.01); *H04L 67/02* (2013.01); *Y02B 60/144* (2013.01)

(58) Field of Classification Search
CPC .................................... G06F 1/3203

USPC ......................................................... 713/323
See application file for complete search history.

(56) References Cited

U.S. PATENT DOCUMENTS 6,185,616 B1   2/2001   Namma et al.
6,308,227 B1 * 10/2001  Kumar et al. ............... 710/4
(Continued)

FOREIGN PATENT DOCUMENTS

CA   2632510 A1   11/2009
GB   2418321 A    3/2006
(Continued)

OTHER PUBLICATIONS

Blandford, Rafe, "Previewing Nokia's Mobile Web Server", Jun. 18, 2007, 11 pages, http://www.allaboutsymbian.com/features/Item/Previewing_Nokias_Mobile_Web_Server.php.
(Continued)

*Primary Examiner* — Suresh Suryawanshi
(74) *Attorney, Agent, or Firm* — Kilpatrick Townsend & Stockton LLP

(57) ABSTRACT

A mobile device having an identifier supports a mobile server hosting an HTML web site. The mobile device is power cycled according to an ON-OFF timing defined by timing parameters. An association between the timing parameters and the identifier of the mobile device is provided. A web client sends a request to access the mobile device, using a public mobile device identifier. Optionally, the public mobile device identifier is mapped to identify ON-OFF timing parameters of the mobile device, and web client access to the mobile device is controlled based on the ON-OFF timing parameters.

41 Claims, 7 Drawing Sheets

Related U.S. Application Data filed on Jan. 18, 2012, provisional application No. 61/588,020, filed on Jan. 18, 2012, provisional application No. 61/588,051, filed on Jan. 18, 2012, provisional application No. 61/588,039, filed on Jan. 18, 2012.

(51) Int. Cl.
| | | |
|---|---|---|
| *H04W 52/02* | (2009.01) | |
| *H04L 29/08* | (2006.01) | |
| *H04W 4/02* | (2009.01) | |

(56) References Cited

U.S. PATENT DOCUMENTS

| | | | |
|---|---|---|---|
| 6,456,854 | B1 | 9/2002 | Chern et al. |
| 6,477,361 | B1 * | 11/2002 | LaGrotta et al. ........... 455/343.1 |
| 6,493,551 | B1 | 12/2002 | Wang et al. |
| 6,526,033 | B1 | 2/2003 | Wang et al. |
| 6,587,882 | B1 | 7/2003 | Inoue et al. |
| 6,594,254 | B1 | 7/2003 | Kelly |
| 6,603,761 | B1 | 8/2003 | Wang et al. |
| 7,016,328 | B2 | 3/2006 | Chari et al. |
| 7,155,521 | B2 | 12/2006 | Lahti et al. |
| 7,269,165 | B2 | 9/2007 | Karino |
| 7,366,840 | B2 | 4/2008 | Tapola |
| 7,480,272 | B2 | 1/2009 | Baba et al. |
| 7,523,491 | B2 | 4/2009 | Dosa Racz et al. |
| 7,620,001 | B2 | 11/2009 | Ganji |
| 7,729,366 | B2 | 6/2010 | Mok et al. |
| 7,783,330 | B2 * | 8/2010 | Dobrowski et al. ............ 455/574 |
| 7,903,596 | B2 * | 3/2011 | Dobrowski et al. ............ 370/311 |
| 7,924,774 | B2 * | 4/2011 | Dobrowski et al. ............ 370/328 |
| 7,983,211 | B2 * | 7/2011 | Lovegren et al. ............. 370/328 |
| 7,986,657 | B2 * | 7/2011 | Dobrowski et al. ............ 370/328 |
| 7,986,968 | B2 * | 7/2011 | Dobrowski et al. ............ 455/557 |
| 8,085,891 | B2 | 12/2011 | Owen |
| 8,311,042 | B2 * | 11/2012 | Nath et al. ................. 370/395.3 |
| 8,438,285 | B2 | 5/2013 | Brown et al. |
| 8,443,420 | B2 | 5/2013 | Brown et al. |
| 8,799,470 | B2 | 8/2014 | Hershko et al. |
| 2003/0018710 | A1 | 1/2003 | Choi |
| 2003/0037254 | A1 | 2/2003 | Fischer et al. |
| 2003/0056207 | A1 | 3/2003 | Fischer et al. |
| 2004/0139227 | A1 | 7/2004 | Takeda |
| 2004/0179537 | A1 | 9/2004 | Boyd et al. |
| 2004/0203752 | A1 | 10/2004 | Wojaczynski et al. |
| 2005/0010656 | A1 | 1/2005 | Lee |
| 2005/0015584 | A1 | 1/2005 | Takechi et al. |
| 2005/0018624 | A1 | 1/2005 | Meier et al. |
| 2005/0043938 | A1 | 2/2005 | Viken et al. |
| 2005/0114895 | A1 | 5/2005 | Ismail et al. |
| 2005/0165909 | A1 | 7/2005 | Cromer et al. |
| 2005/0246414 | A1 | 11/2005 | Barda |
| 2006/0080404 | A1 | 4/2006 | Haber-Land-Schlosser et al. |
| 2006/0154662 | A1 | 7/2006 | Kil et al. |
| 2006/0195506 | A1 | 8/2006 | Deng |
| 2006/0200503 | A1 | 9/2006 | Dosa et al. |
| 2006/0200541 | A1 | 9/2006 | Wikman et al. |
| 2007/0047585 | A1 | 3/2007 | Gillespie et al. |
| 2007/0160001 | A1 | 7/2007 | Lovegren et al. |
| 2007/0165579 | A1 | 7/2007 | Delibie et al. |
| 2007/0180081 | A1 | 8/2007 | Okmianski et al. |
| 2007/0197260 | A1 | 8/2007 | Randall et al. |
| 2007/0214209 | A1 | 9/2007 | Maeda |
| 2008/0005290 | A1 | 1/2008 | Nykanen et al. |
| 2008/0123624 | A1 | 5/2008 | Strandell et al. |
| 2008/0137628 | A1 | 6/2008 | Matsumoto et al. |
| 2008/0166997 | A1 | 7/2008 | Sun et al. |
| 2008/0248834 | A1 | 10/2008 | Chatterjee et al. |
| 2008/0313255 | A1 | 12/2008 | Geltner et al. |
| 2009/0036111 | A1 | 2/2009 | Danford et al. |
| 2009/0106366 | A1 | 4/2009 | Virtanen et al. |
| 2009/0150904 | A1 | 6/2009 | Champagne et al. |
| 2009/0222438 | A1 | 9/2009 | Strandell et al. |
| 2009/0228545 | A1 | 9/2009 | Mendez et al. |
| 2010/0015916 | A1 | 1/2010 | Holcman et al. |
| 2010/0131583 | A1 | 5/2010 | Lee et al. |
| 2010/0178953 | A1 | 7/2010 | Blewett et al. |
| 2010/0211563 | A1 | 8/2010 | Macchietti et al. |
| 2010/0211637 | A1 | 8/2010 | Borzsei et al. |
| 2010/0215035 | A1 | 8/2010 | Jeng Yen |
| 2010/0330976 | A1 | 12/2010 | Berna Fornies et al. |
| 2011/0061000 | A1 | 3/2011 | Andreasson |
| 2011/0078120 | A1 | 3/2011 | Tyhurst et al. |
| 2011/0119600 | A1 | 5/2011 | Liu et al. |
| 2011/0145391 | A1 | 6/2011 | Ivershen |
| 2012/0210205 | A1 | 8/2012 | Sherwood et al. |
| 2013/0067026 | A1 | 3/2013 | Hershko et al. |
| 2013/0067084 | A1 | 3/2013 | Hershko et al. |
| 2013/0067085 | A1 | 3/2013 | Hershko et al. |
| 2013/0067086 | A1 | 3/2013 | Hershko et al. |
| 2013/0074108 | A1 | 3/2013 | Cline et al. |
| 2013/0097682 | A1 | 4/2013 | Zeljkovic et al. |
| 2013/0104246 | A1 | 4/2013 | Bear et al. |
| 2013/0132854 | A1 | 5/2013 | Raleigh et al. |
| 2013/0159066 | A1 | 6/2013 | Welch |

FOREIGN PATENT DOCUMENTS

| | | |
|---|---|---|
| JP | 2002109393 A | 4/2002 |
| JP | 2003152766 A | 5/2003 |
| JP | 2007041710 A | 2/2007 |
| JP | 2007188189 A | 7/2007 |
| JP | 2007311851 A | 11/2007 |
| JP | 2008097314 A | 4/2008 |
| JP | 2008148057 A | 6/2008 |
| KR | 20140030126 A | 3/2014 |
| WO | 02073921 A2 | 9/2002 |
| WO | WO-2010043440 A1 | 4/2010 |

OTHER PUBLICATIONS

Kawamura, S. et al.,"End-to-End Mobility Management: A Two-Phase Deployment Scheme for Personal Use", International Conference on Wireless Networks, 2004, p. 1-6, See p. 4 col. 2, (ICWN-4).

Nokia, Overview from Mobile Web Server, 2010, 2 pages, http://research.nokia.com/page/231.

International Search Report and Written Opinion—PCT/US2013/022300—ISA/EPO—Apr. 25, 2013.

\* cited by examiner

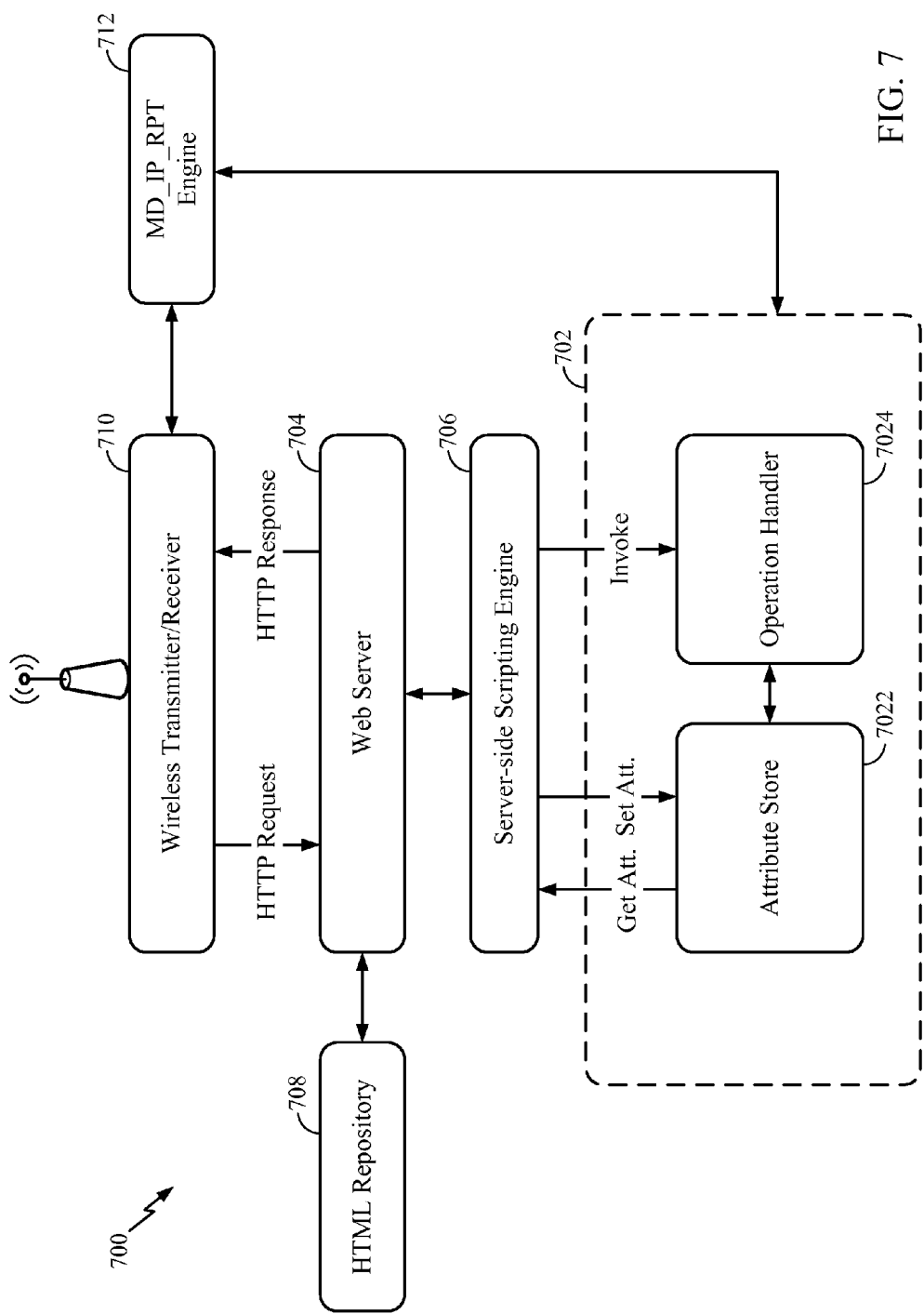

REMOTE ACCESS AND ADMINISTRATION OF DEVICE CONTENT, WITH DEVICE POWER OPTIMIZATION, USING HTTP PROTOCOL

CLAIM OF PRIORITY UNDER 35 U.S.C. §119

The present application for patent is a Continuation-in-Part of non-provisional application Ser. No. 13/415,636, entitled "REMOTE ACCESS AND ADMINISTRATION OF DEVICE CONTENT AND CONFIGURATION USING HTTP PROTOCOL", filed Mar. 8, 2012 which claims priority to provisional applications 61/452,031, entitled "REMOTE MOBILE ADMINISTRATION AND LOGGING USING HTTP PROTOCOL", filed Mar. 11, 2011, and 61/588,007, entitled "REMOTE ACCESS AND ADMINISTRATION OF DEVICE CONTENT, WITH DEVICE POWER OPTIMIZATION, USING HTTP PROTOCOL," filed Jan. 18, 2012. The present application for patent also claims priority to provisional applications 61/588,020, entitled "REMOTE ACCESS AND ADMINISTRATION OF DEVICE CONTENT, WITH DEVICE POWER OPTIMIZATION, USING HTTP PROTOCOL", filed Jan. 18, 2012, 61/588,051, entitled "SYSTEM AND METHOD USING A WEB PROXY-SERVER TO ACCESS A DEVICE HAVING AN ASSIGNED ADDRESS", filed Jan. 18, 2012, and 61/588,039, entitled "SYSTEM AND METHOD FOR ACCESSING A DEVICE HAVING AN ASSIGNED ADDRESS", filed Jan. 18, 2012 and assigned to the assignee hereof and hereby expressly incorporated by reference herein.

This present application for patent also relates to non-provisional application Ser. No. 13/415,614, entitled "SYSTEM AND METHOD USING A WEB PROXY-SERVER TO ACCESS A DEVICE HAVING AN ASSIGNED NETWORK ADDRESS", filed Mar. 8, 2012 and Ser. No. 13/415,581, entitled "SYSTEM AND METHOD FOR ACCESSING A DEVICE HAVING AN ASSIGNED NETWORK ADDRESS", filed Mar. 8, 2012 and assigned to the assignee hereof and is hereby expressly incorporated by reference herein.

FIELD OF DISCLOSURE

The field of disclosure relates to mobile device operation in general, and more particularly, to the remote operation and management of a mobile device using a Hyper Text Transfer Protocol (HTTP) protocol.

BACKGROUND

Techniques exist for capturing mobile location information and providing it to a user. One such technique includes the mobile device initiating a session with a central server and reporting its current location. The reported current location of the mobile device is archived by the central server and then provided to those who are authorized, for example in accordance with a custom application, to receive updates on the whereabouts of the device.

Among example shortcomings, limitations and potential concerns (collectively "limitations") of this conventional technique are costs and use barriers imposed by its general requirement for customized, often proprietary applications not in the general standard features set of consumer internet access devices.

Another example limitation with these conventional techniques directed to remote access to mobile device services and content is that the content that the mobile device transmits is generally raw data. In other words, the data representing the content or the information and parameters of the services is not readily receivable, and/or not readily decodable by the Internet access machine through which the user performs the remote access unless the user has special-purpose, often proprietary applications installed on his/her machine.

Further, in designing and using conventional techniques for remote access to a mobile device's services and content, trade-offs may occur between battery life of the mobile device and the usability of the access. The tradeoff can establish hard limits on the scope of uses. For example, to provide uninterrupted accessibility to the mobile device can require that the device be powered-up continuously. However, maintaining continuous power-up can quickly drain batteries. On the other hand, an access attempt can fail if the device is not powered up continuously. Therefore, the mobile device and the access to the device may embody a tradeoff between these two desired but, in conventional techniques, opposing objectives, namely battery life and reliability of access. The result can be, as an illustration, a mobile device that is more expensive and/or in a significantly larger package than desired, or even practical, or a mobile device to which a user has less than continuous access.

SUMMARY

Exemplary embodiments of the inventive concepts, and various aspects, are described in greater detail below. As will be appreciated by persons of ordinary skill in the art from reading this description, the concepts and exemplary embodiments of the same can provide, among various benefits and features, significant durations of an effectively uninterrupted, accessibility to mobile device services and content.

Further appreciated by such persons from reading this description is that the concepts and exemplary embodiments can provide these and other features and benefits without concomitant need for larger batteries.

Still further, and as will be understood by persons of ordinary skill in the art from reading this disclosure, the concepts and exemplary embodiments and aspects can provide, among other features and benefits, significant ease-of-use and enhanced user-experience.

Further appreciated by such persons from this disclosure is that its concepts and the exemplary embodiments and aspects can provide these example features and benefits, and others, with novel configurations and arrangements of what can be off-the-shelf hardware and software.

Exemplary embodiments provide, among other features, a method of making mobile device services and content available to users remote from the device using, in one aspect, conventional HTTP web client browser and without requiring special applications.

In methods and systems according to one or more exemplary embodiments, one aspect can provide to users remote from mobile device(s) convenient access to content and services resident in the mobile devices by providing the mobile device with selective configurability as an HTTP web server.

In an aspect, methods and systems according to various exemplary embodiments can provide the mobile device with configurability to function, selectively according to various aspects, as a mobile HTTP web server.

In one further aspect, methods and systems according to various exemplary embodiments can include, in providing mobile devices with configurability to function as, or as a host of, a mobile HTTP web server provision to report, through various means and methods, a status and whereabouts of the mobile device and/or the mobile HTTP web server hosted by the device. In one still further aspect, the reporting features can be combined with various system updating features. In an aspect, various system updating features can include novel system maintenance of the mobile device and its hosted HTTP web server being provided with mobile capability to operate as, or to embody, a mobile HTTP web server.

One method for reduced power consumption access to mobile device content according to one exemplary embodiment can include assigning an assigned ON-OFF power cycle timing of the mobile device, and the assigning may include associating the assigned ON-OFF power cycle timing of the mobile device with a mobile device identifier that identifies the mobile device, and the method can further include receiving a HyperText Transfer Protocol request from a web client for access to a content of the mobile device, the HyperText Transfer Protocol request including the mobile device identifier, obtaining, based on the mobile device identifier, an obtained ON-OFF power cycle timing of the mobile device, the obtained ON-OFF power cycle timing of the mobile device being the assigned ON-OFF power cycle timing, and controlling web-client access requested by the HyperText Transfer Protocol request to the mobile device based, at least in part, on the obtained ON-OFF power cycle timing of the mobile device.

In an aspect, one method according to one exemplary embodiment can include storing the assigned ON-OFF power cycle timing of the mobile device in a database to be retrievable based on the mobile device identifier of the mobile device.

In a further aspect, obtaining the ON-OFF power cycle timing of the mobile device can include querying the database, using the mobile device identifier of the mobile device.

In another aspect, receiving the HyperText Transfer Protocol request from the web client can be at a web server, and one method according to one exemplary embodiment can further include receiving an absolute time signal, the receiving being at the web server and at the web client and at the mobile device. In a related aspect, controlling web-client access can include sending from the web server to the web client an instruction having a direct address for accessing the mobile device and an instruction for performing the accessing at a time schedule, relative to the absolute time signal, based on the obtained ON-OFF power cycle timing of the mobile device.

In an aspect, in one method for reduced power consumption access to mobile device content according to one exemplary embodiment, assigning the assigned ON-OFF power cycle timing of the mobile device can include selecting, based on an arithmetic function of the identifier of the mobile device, a time schedule among a given plurality of time schedules, and assigning said time schedule as the assigned ON-OFF power cycle timing of the mobile device.

In a related aspect, obtaining the obtained ON-OFF power cycle timing of the mobile device can include applying said arithmetic function to the mobile device identifier of the mobile device.

In another aspect, receiving the HyperText Transfer Protocol request from the web client can be at a web server and, further, the obtained ON-OFF power cycle timing of the mobile device can be based on a result of the applying said arithmetic function to the identifier of the mobile device, and controlling web-client access can include sending from the web server to the web client an instruction having a direct address for accessing the mobile device and an instruction for performing the accessing at a time schedule based on the obtained ON-OFF power cycle timing relative to the absolute time signal.

In another aspect, controlling web-client access can include sending an access request pending indicator from the web server to the web client, and the sending can be anywhere in a time interval beginning at the sending of the instruction for performing the accessing and ending at a time based on the obtained ON-OFF power cycle timing of the mobile device.

In an aspect, one method for reduced power consumption access to mobile device content according to one exemplary embodiment can further include maintaining a database associating the mobile device identifier with an assigned IP address, and performing, based on the mobile device identifier in the HyperText Transfer Protocol request, a query of the database associating the mobile device identifier with the assigned IP address, to obtain the assigned IP address. In a related aspect, controlling web-client access requested by the HyperText Transfer Protocol request to the mobile device can include sending the web client an HyperText Transfer Protocol re-direct request, the HyperText Transfer Protocol re-direct request including the assigned IP address.

One method for reduced power consumption access to mobile device content can include, in accordance with one exemplary embodiment, receiving at a web client an absolute time signal, sending a HyperText Transfer Protocol connect request from the web client to a web server, for web client access to a content of a mobile device, the HyperText Transfer Protocol connect request including a mobile device identifier identifying the mobile device, receiving at the web client, from the web server, an instruction to redirect to an IP address associated with the mobile device, wherein the redirect is at a specific time relative to the absolute time signal, and sending a HyperText Transfer Protocol redirect from the web client to the mobile device in accordance with the specific time.

In an aspect, one method for reduced power consumption access to mobile device content according to the one exemplary embodiment can further include receiving at the web client an access request pending indicator from the web server, said receiving being anywhere in a time interval beginning at the receiving of the instruction to redirect at the specific time ending at a time based on the specific time, and displaying at the web client a visual status indicator based on the access request pending indicator.

In an aspect, one method for reduced power consumption access to mobile device content according to the one exemplary embodiment can further include starting a connection time-out timer in association with the sending the HyperText Transfer Protocol redirect, and in response to the connection time-out timer reaching a time-out value prior to receiving at the web client an HyperText Transfer Protocol connected communication corresponding to the HyperText Transfer Protocol redirect, performing a query of an information source having a last reported location of the mobile device, and displaying a result of the query.

In an aspect, one method for reduced power consumption access to mobile device content according to the one exemplary embodiment can further include starting a connection time-out timer in association with the sending the HyperText Transfer Protocol redirect, and, in response to the connection time-out timer reaching a time-out value prior to receiving at the web client a HyperText Transfer Protocol connected communication corresponding to the HyperText Transfer Protocol redirect, performing an interrogation of a cellular network associated with the mobile device for a last detected cell site location of the mobile device, and displaying a result of the interrogation.

In another aspect, one method for reduced power consumption access to mobile device content according to the one exemplary embodiment can further include receiving at the web client a HyperText Transfer Protocol connected communication corresponding to the HyperText Transfer Protocol redirect, sending from the web client to the mobile device a request for a mobile device location fix, starting a location fix time-out timer in association with the sending to the mobile device the request for a mobile device location fix, and, in response to the location fix time-out timer reaching a time-out value prior to receiving at the web client a mobile device location fix corresponding to the request for a mobile device location fix, performing an interrogation of a cellular network associated with the mobile device for a current detected cell site location of the mobile device, and displaying a result of the interrogation.

One exemplary embodiment can include a computer-readable medium storing instructions which, when executed by a processor in a wireless communications system, can cause the processor to perform a method of reduced power consumption access to mobile device content. In according with the exemplary embodiment, the instructions can include instructions that cause a processor to assign an assigned ON-OFF power cycle timing of the mobile device, and to associate the assigned ON-OFF power cycle timing of the mobile device with a mobile device identifier that identifies the mobile device, instructions that cause a processor to receive a Hyper-Text Transfer Protocol request from a web client for access to a content of the mobile device, the HyperText Transfer Protocol request including the mobile device identifier, instructions that cause a processor to obtain, based on the mobile device identifier, an obtained ON-OFF power cycle timing of the mobile device, the obtained ON-OFF power cycle timing of the mobile device being the assigned ON-OFF power cycle timing, and instructions that cause a processor to control web-client access requested by the HyperText Transfer Protocol request to the mobile device based, at least in part, on the obtained ON-OFF power cycle timing of the mobile device.

One exemplary embodiment can include a computer-readable medium storing instructions which, when executed by a processor in a wireless communications system, can cause the processor to perform another method of reduced power consumption access to mobile device content. Further to the exemplary embodiment, the instructions can include instructions that cause a processor to receive at a web client an absolute time signal, instructions that cause a processor to send a HyperText Transfer Protocol connect request from the web client to a web server, for web client access to a content of the mobile device, the HyperText Transfer Protocol connect request including a mobile device identifier that identifies the mobile device, instructions that cause a processor to receive at the web client, from the web server, an instruction to redirect at a specific time relative to the absolute time signal to an IP address associated with the mobile device, and instructions that cause a processor to send a HyperText Transfer Protocol redirect from the web client to the mobile device in accordance with the specific time.

BRIEF DESCRIPTION OF THE DRAWINGS

The accompanying drawings are presented to aid in the description of embodiments of the invention and are provided solely for illustration of the embodiments and not limitation thereof.

FIG. 7 is a high level functional block diagram of one public web client, inter-network accessible mobile server device according to one exemplary embodiment.

DETAILED DESCRIPTION

Various aspects of the invention are disclosed in the following description and related drawings directed to specific embodiments. Alternate embodiments may be devised without departing from the scope of the invention. Additionally, well-known elements will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

The terminology used herein is for the purpose of describing only particular example implementations, and illustrative operations according to various embodiments, and is not intended to limit the scope of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Figure 1:
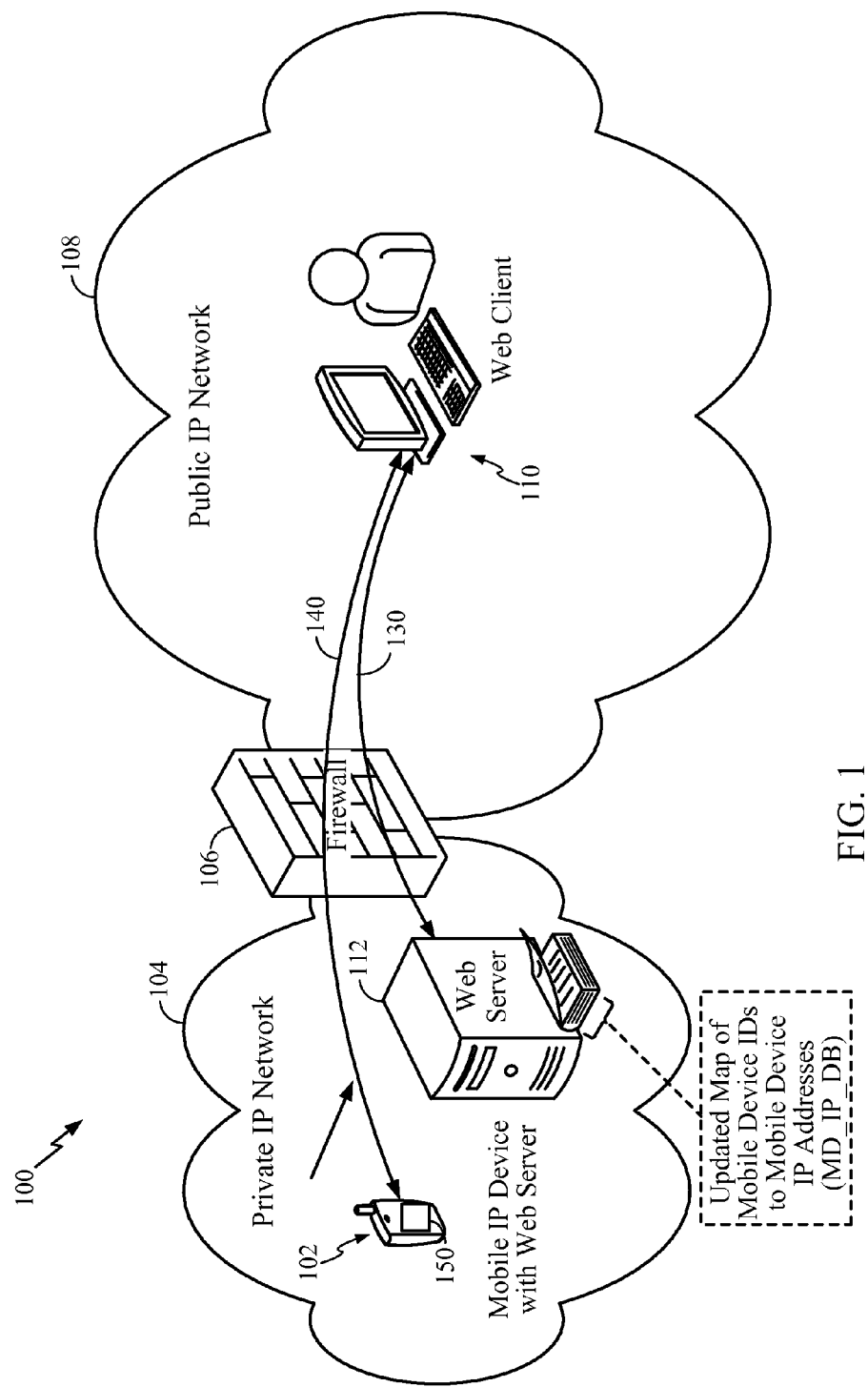
FIG. 1 is a high level schematic diagram of one public web client, inter-network accessible mobile server system according to one exemplary embodiment.

FIG. 1 is a high level schematic diagram of one internetwork, web browser client access mobile device server system (hereinafter alternatively referenced, for brevity, as "browser access/mobile web server system") 100 including, and providing one example environment for practicing methods and systems according to, various exemplary embodiments. FIG. 1 also shows, superposed on the high level schematic diagram of the browser access/mobile web server system 100, example communications in practices according to one or more exemplary embodiments.

Referring to FIG. 1, the browser access/mobile web server system 100 can include one or more wireless mobile devices having processing and storage capabilities to host a mobile HTTP server, of which the wireless mobile device/mobile HTTP web server 102 is representative, each capable of connecting to the Private IP network 104. It will be assumed that the wireless mobile device/HTTP web server 102 includes interface logic and signaling transceivers (not explicitly shown in FIG. 1) for communicating with the Private IP network 104. It will be understood that the mobile HTTP server 150 is shown as a distinct block within the wireless mobile device/mobile HTTP web server 102 only for purposes of describing example interfaces. It will be understood that except in instances where explicitly stated or made clear from the context to mean otherwise, the phrase "wireless mobile device/mobile HTTP web server 102" includes the mobile HTTP server 150.

The wireless mobile device/mobile HTTP web server 102 can be any hardware platform capable of hosting an HTTP web server, for example, without limitation any of an Apple iPhone®, HTC Droid Incredible®, RIM Blackberry®, or any of various "tablets" (e.g., without limitation, Apple iPad®, Samsung Galaxy®). The wireless mobile device/mobile HTTP device 102 can be a reduced size/weight device, for example a dog-collar monitor/tracking device, provided it has processing and storage capabilities to host the mobile HTTP server 150 and perform as described herein.

In an aspect, the mobile HTTP server 150 hosted on the wireless mobile device/mobile HTTP web server 102 (as well as other applications on the device 102) can interface, for example through firewall 106, with a Public IP network 108. The Public IP network 108 can be, but is not necessarily, the Internet. Regarding the scope of structures for implementing the firewall 106, it will be understood that the "firewall 106" is not necessarily a single firewall device but, instead, represents a firewall resource that may, for example, be implemented as a distributed plurality of web servers (not specifically shown) interfacing the Private IP network 104 with the Public IP network 108. It will be understood that the firewall 106 can be implemented by persons of ordinary skill in the art upon reading this disclosure by, for example, adapting conventional firewall techniques to the concepts described, using conventional engineering principles and know-how such persons possess. Therefore, except for operations incident to examples showing concepts and practices according to the embodiments, further detailed description of the firewall 106 is omitted.

Referring still to FIG. 1, the browser access/mobile web server system 100 can include a plurality of client/web browsers connected to the Public IP network 108, of which the client/web browser 110 is representative. The client/web browser 110 can, in one aspect, be an HTML web browser (not separately shown), for example Internet Explorer®, Safari®, Firefox®, Chrome®, Opera™, or any of the various other known commercially available HTML web browsers hosted on any hardware platform capable of such hosting. Example platforms include, without limitation, a laptop or desktop personal computer (PC) running under, for example, one or more of the various known operating systems that can support the identified or equivalent HTML web browser. The host of the client/web browser 110 can be connected to the Public IP network 108 through, for example, any one or more conventional techniques, e.g., a cellular wireless (not shown) access, via EVDO, HSDPA or UMTS, or a Wi-Fi or Ethernet connection (not shown) to a cable or DSL modem (not shown), which can then connect to the Public IP network 108 through, for example, an Internet Service Provider (ISP) (not shown).

With continuing reference to FIG. 1, the hardware platform supporting the client/web browser 110 is not particular to practices of the exemplary embodiments. The hardware platform of the client/web browser 110 can be, for example, any communication device, e.g., a smartphone, capable of hosting a client HTTP web browser, for example, without limitation any of an Apple iPhone®, HTC Droid Incredible®, RIM Blackberry®, or any of various "tablets" (e.g., without limitation, Apple iPad®, Samsung Galaxy®). With respect to the operating systems under which the client/web browser 110 can operate, as will be readily understood by persons of ordinary skill in the art from reading this description, there are no consideration particular to the embodiments other than the combination of the client/web browser 110, the hardware platform on which it operates, and the operating system under which it operates supporting the described HTTP communications with the mobile HTTP web server 150 of the wireless mobile device/mobile HTTP web server 102. Examples of such operating systems include without limitation, Windows® XP, Windows 7, Apple® OSX, and Linux, and for smartphones include, without limitation, Symbian ^3, Symbian Anna, Apple iOS, Windows Phone 7, Windows Phone Mango, and Blackberry OS 7.

Referring to FIG. 1, in an aspect each wireless mobile device/mobile HTTP web server 102 can be assigned a unique device identifier (not shown in FIG. 1), arbitrarily named in this description as MDevice_ID. The MDevice_ID can be, for example, a Media Access Control (MAC) address. The assignment of the MDevice_ID, for example in an implementation as a MAC address, can be in accordance with known conventional MAC address assignment techniques and, therefore, further detailed description is omitted.

In a further aspect, the wireless mobile device/mobile HTTP web server 102 can be assigned a mobile device IP (MD_IP) address (not shown in FIG. 1). In one aspect, the MD_IP address is routable within the Public IP network 108 (e.g., routable within the Internet). As will be understood from this description, the MD_IP address being routable within the Public IP network 108 provides the client/web browser 110, after receipt of the MD_ID address of the target wireless mobile device/mobile HTTP web server 102, direct access to the mobile HTTP web server 150. The MD_IP address, in one aspect, can be dynamically assigned, for example in accordance with conventional Dynamic Host Configuration Protocol (DHCP) techniques that are known to persons of ordinary skill in the art and, therefore, further detailed description is omitted.

Continuing to refer to FIG. 1, the browser access/mobile web server system 100 can, in an aspect, maintain a database associating each wireless mobile device/mobile HTTP web server 102 supported with its most recent assigned MD_IP address. The database can be named "the mobile device IP database (MD_IP_DB)," and in an aspect can have a plurality of entries. In a related aspect, each entry of the MD_IP_DB can have the MDevice_ID of the wireless mobile device/mobile HTTP web server 102, as well MD_IP_DB as the MDevice_ID of each of a plurality (not shown) of other wireless mobile devices and, associated with each MDevice_ID, its most recently assigned MD_IP address. In one aspect, the MD_IP_DB can be maintained in a Web Server 112. The MD_IP_DB can be a table or equivalent, addressable according MDevice_ID and/or a public identifier (e.g., a ten digit cellular telephone number) assigned to the wireless mobile device/mobile HTTP web server 102. Regarding functions of the MD_IP_DB, as will be understood from examples described below of operations according to exemplary embodiments of the client/web browser 110 accessing a target wireless mobile device/mobile HTTP web server 102 can include providing the client/web browser 110, using the MD_IP_DB, with the most recent MD_IP of that target wireless mobile device/mobile HTTP web server 102. In other words, in accordance with an exemplary embodiment, the HTTP web server 102 can provide the client/web browser 110 with a direct address to the target wireless mobile device/mobile HTTP web server 102, namely its most recent IP address.

Referring to FIG. 1, in one aspect the Web Server 112 can be located in the Private IP network 104 and made accessible to the client/web browser 110 by connecting the Web Server 112 to the Public IP network 108 through the above-described firewall 106.

Referring still to FIG. 1, it will be understood that embodiments are not limited to a Web server within the Private IP network 104, e.g., Web Server 112, having the MD_IP_DB. For example, referring to FIG. 2, one alternative embodiment 200 can locate a Web Server 212 having the MD_IP_DB within the Public IP network 108. It will be understood that link 230 shown between the client/web browser 110 and the Web Server 212 may be a logical link. For example, link 230 may be through the Public IP network 108, or may be through a local network (not explicitly shown). Further, embodiments contemplate the client/web browser 110 and Web Server 212 residing on, or supported by a common hardware resource (e.g., a PC). In such a case, link 230 may be an access process within the common hardware resource.

Figure 2:
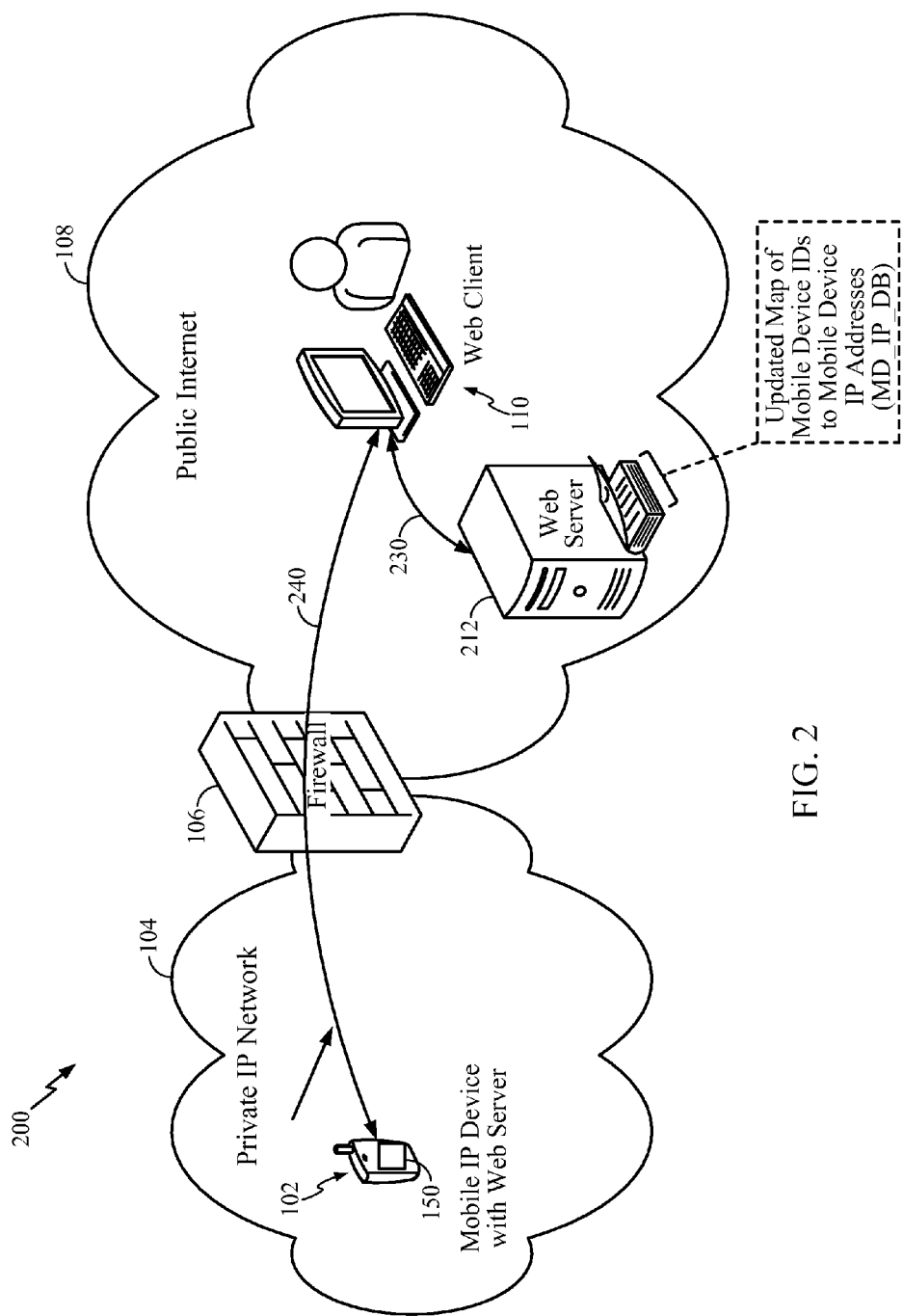
FIG. 2 is a high level schematic diagram of one public web client, inter-network accessible mobile server system according to another exemplary embodiment.

Referring still to FIG. 2, link 240 represents a logical link between the client/web browser 110 and the mobile HTTP server 150, for example established by processes in accordance with one or more exemplary embodiments described in greater detail below.

Referring to FIGS. 1 and 2, it will be understood that the Web Server 112 and the Web Server 212, and their respective MD_IP_DBs, are not necessarily mutually exclusive. For example, embodiments contemplate a functional superposition of FIGS. 1 and 2, by maintaining the Web Server 212 MD_IP_DB as a mirror of the Web Server 112 MD_IP_DB. Additionally, referring again to FIG. 2, embodiments are not limited to the Web Server 212 being physically separate from the hardware and operating system platform supporting the client/web browser 110.

It will be understood that practices according to the exemplary embodiments may include multiple mobile web servers 150 hosted on a single wireless mobile device/HTTP mobile web server 102 and that each of such mobile HTTP web server may be assigned a routable IP address. Persons of ordinary skill, based on the present disclosure, can readily adapt its concepts to such an embodiment, for example by modifying the MD_IP_DB.

Referring still to FIG. 1, as stated earlier in this description, each wireless mobile device/mobile HTTP web server 102 can be assigned or associated with a public identifier. For consistent reference to examples, the public identifier will be arbitrarily referenced herein as "public MDAccess_ID," which is not shown in FIG. 1. It will be understood that the name "public MDAccess_ID" is an arbitrary name, not intended as any limitation on the scope of any embodiments. Stated differently, practices according to various exemplary embodiments can use an identifier of any name that functions as, or in a manner equivalent to the public MDAccess_ID. One example public MDAccess_ID can be a ten-digit telephone number of a. wireless cellular telephone feature (not shown in FIG. 1) of the wireless mobile device/mobile HTTP web server 102. In an aspect the Web Server 112 can be configured to maintain, for example as a feature of the MD_IP_DB, a mapping for each wireless mobile device/mobile HTTP web server 102 of its MDevice_ID to its assigned public MDAccess_ID.

Continuing with description of the public MDAccess_ID aspect, according to one or more exemplary embodiments, the Web Server 112 can be configured to provide the client/web browser 110, based only on the public MDAccess_ID, e.g., the ten-digit cellular phone number, with the most recent MD_IP address for a target mobile device/mobile HTTP server 102. On example of such a configuring can be forming the MD_IP_DB as a table (not shown) having an entry for each wireless mobile device/mobile HTTP web server supported, each entry having a field (not shown) for the MDevice_ID, a field for the most recently updated MD_IP address, and a field for the public MDAccess_ID. The above-described example means of using the public MDAccess_ID of a target wireless mobile device/mobile HTTP web server 102 to provide the client/web browser 110 its most recently assigned MD_IP address is not intended as a limitation on the scope of any embodiments. On the contrary, one example alternative means can include maintaining a public MDAccess_ID to MDevice_ID mapping table (not shown). Further to this example alternative means, the public MDAccess_ID to MDevice_ID mapping table can be included in the Web Server 112.

Figure 3:
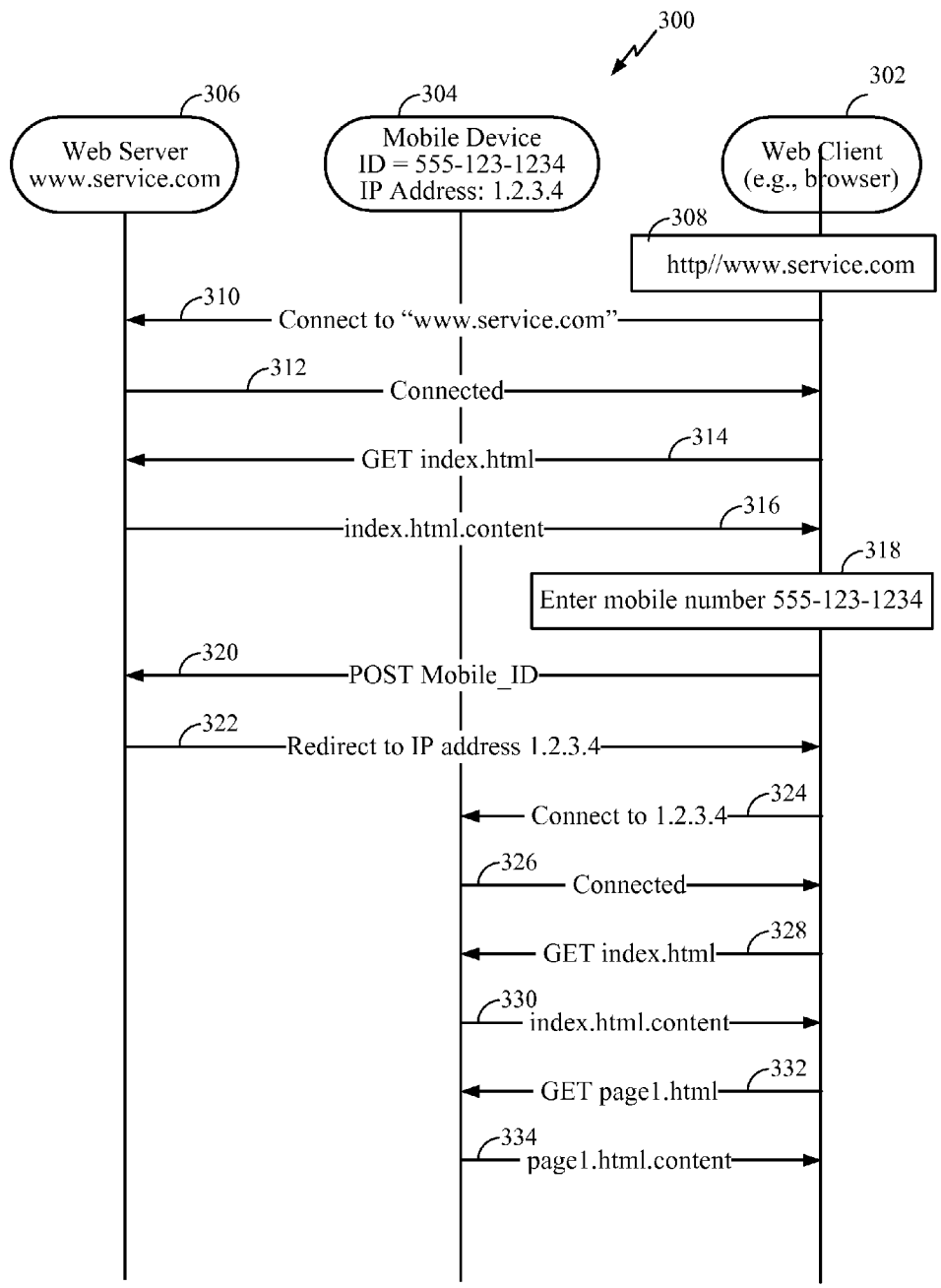
FIG. 3 shows a system call process flow of one example call session in a public web client, inter-network mobile server access method according to one or more exemplary embodiments.

FIG. 3 shows one example mobile device access call flow 300 that will be referenced in describing example operations in one example process according to one or more exemplary embodiments. As will be appreciated, the process described in reference to the mobile device access system call flow 300 can provide a user having Web Client 302 with substantially transparent access to Mobile Device 304, notwithstanding that device having a power cycling timing, via Web Server 306 performing described timing and re-directing operations. For purposes of illustration, FIGS. 1, 2 and 3 can be viewed together, the Web Client 302 understood as being the client/web browser 110 or 210, the Mobile Device 304 being the mobile device/mobile HTTP web server 102, and the Web Server 306 being the Web Server 112 or 212. The mobile device access system call flow 300 assumes the Web Server 306 is configured with or otherwise has access to a database having identifiers for each of one or more Mobile Devices 304 and, for each, its most recently assigned IP address (e.g., MD JP), and that the Web Server 306 includes server-side scripting capability to query the database. In one example process as shown by the mobile device access call flow 300, the Web Server 306 can include a feature of a mapping of public identifiers for the Mobile Devices 304 (e.g., the public MDAccess_ID described in reference to FIGS. 1, 2).

Referring to FIG. 3, in one example process as shown by the mobile device access system call flow 300 can begin at 308 with a user of the Web Client 302 typing the URL address of the Web Server 306, for example a URL address of "http://www.service.com". The Web Client 302 at 310 sends a corresponding HTTP Connect to "www.service.com" communication. Referring to FIGS. 1 and 3 together, the HTTP Connect to "www.service.com" communication at 310 can be over a link 140 through the Public IP Network 108 (e.g., the Internet) to the Web Server 112. It will be understood that link 140 represents a logical packet link, for example formed by actions of conventional Internet TCP/IP routers (not shown), not necessarily an assigned circuit.

With continuing reference to FIG. 3, in one example process as shown by the mobile device access system call flow 300, after the Web Server 306 receives the HTTP Connect to "www.service.com" communication sent by the Web Client 302 at 310, the Web Server 306 sends at 312 an HTTP Connected communication to the Web Client 302. The Web Client 302, upon receiving the HTTP Connected communication sent by the Web Server 306 at 312, sends at 314 an HTTP "GET.index.HTML" command to the Web Server 306. The Web Server 306 can then respond at 316 with an HTTP "index.HTML" communication to the Web Client 302.

Continuing to refer to FIG. 3, in one example process as shown by the mobile device access system call flow 300 the HTTP "index.HTML" can include instructions for the Web Client 302 to display a "login" screen (not shown in FIG. 3). The form of the login screen, if used, is a design choice. Continuing with the example, at 318, the user can enter login credentials (optional) and then the public MDAccess_ID of, or associated with the Mobile Device 304. The example shown is "555-123.1234." This example is arbitrary. It will be understood that embodiments are not limited to a ten-digit telephone number for the public MDAccess_ID.

Referring still to FIG. 3, at 320 the Web Client 302 sends, in one aspect, an HTTP POST Mobile ID communication. In one aspect, the "Mobile ID" can be the public MDAccess_ID, which in this example is "555-123-1234." In another aspect, in place of the HTTP POST Mobile ID, the Web Client 302 at 320 can send an HTTP GET (not shown on FIG. 3). These are only examples, and others may become apparent to persons of ordinary skill in the art from reading this disclosure or practicing according to its embodiments. The Web Server 306 responds at 322 by mapping the public MDAccess_ID to the most recent MD_IP address assigned to the target Mobile Device 304 and sending the Web Client 302 an HTTP Redirect to IP Address "1.2.3.4," in other words a redirect to that MD_IP address.

Referring to FIG. 3, as previously described the MD_IP addresses are, in an aspect, routable within the Public IP network 108. Further to this aspect, the Web Client 302, upon receiving the HTTP Redirect to IP Address "1.2.3.4" sent at 322, sends, at 324, an HTTP "Connect to 1.2.3.4" directly to the target Mobile Device 304. Referring to FIG. 1, this can be over link 130. It is assumed for this example that the Mobile Device 304 is listening to a port corresponding to the MD_IP address of "1.2.3.4." Therefore, upon the Mobile Device 304 detecting, for example by listening to the corresponding port, the HTTP Connect to "1.2.3.4" sent by the Web Client 302 at 324 the Mobile Device 304 sends, at 326, an HTTP "Connected" communication to the Web Client 302.

With continuing reference to FIG. 3, in one example process the mobile device access system call flow 300, upon the Web Client 302 receiving the HTTP Connected communication sent by the target Mobile Device 304 at 326, it sends at 328 an HTTP "GET.index.html" communication, directly to the Mobile Device 304. In one further example process according to the mobile device access system call flow 300, upon the Mobile Device 304 receiving the HTTP GET.index.html communication sent by the Web Client 302 at 328, the Mobile Device 304 responds at 330 with an HTTP "index.html.content" communication to the Web Client 302. In one example, the Web Client 302 can respond to the HTTP index.html.content communication, either automatically or further to additional inputs from the user, by sending at 332 an HTTP "GET page 1.html" communication to the Mobile Device 304. In an aspect, the Mobile Device 304 can respond to the HTTP GET page 1.html communication sent by the Web Client 302 at 332 by sending at 334 the "page1.html.content."

With respect to specific content of "page1.html.content," this can be any content or service, for example, a photo album on the Mobile Device 304, or a location or other status of the physical environment in which the Mobile Device 304 is situated. The user requests, such as the example exchanges at 330 and 332, can continue, in accordance with conventional HTTP web site access until, for example, the user closes the Web Client 302, or until a no-activity time-out from a connection time-out timer is detected, for example at the Web Client 302 or at the Mobile Device 304.

Referring still to FIG. 3, it will be understood by persons of ordinary skill in the art, upon viewing the present disclosure, that such persons can readily program or configure scripts, for example in the Web Client 302, to perform various actions described in the examples above as being performed manually by a user. As illustration, persons of ordinary skill in the art, by applying conventional programming techniques known to such persons to the present disclosure, can readily configure a "hot button" activated Visual Basic (or equivalent) macro to perform one or more of the above-described action 308, page content request at 332, and even the entering at 318 of the identifier of the target Mobile Device 304.

I. Providing for Optimizing Power-Consumption of Mobile Devices, Concurrent with Provide for an Effectively Continuous Access The above-described concepts and embodiments of the same provide benefits that will be readily appreciated by persons of ordinary skill in the art, from the description and from practices according to the embodiments. The benefits include overcoming or obviating various described limitations of conventional techniques for accessing content and services of mobile devices. For example, practices of the above-described concepts and embodiments can be implemented with conventional, off-the-shelf hardware and software. To illustrate, according to various aspects access to the mobile device requires nothing more than a conventional client web browser, connected by conventional means to the Internet, e.g., a laptop computer connected to the Internet via a coffee-shop Wi-Fi. Based on this present disclosure, a person of ordinary skill in the art of server-side scripting and web site construction can implement embodiments that can present in a readable form the content of the accessed mobile device to the user of the web browser and, provide the user with convenient interface with services resident on the mobile device.

Further concepts and embodiments of the same provide means to substantially overcome or obviate another of the described limitations of conventional techniques for remote access to mobile device content and services, namely the need for tradeoff between battery life of the mobile device and the usability of the access. As previously described, the tradeoff can establish hard limits on the scope of uses of the conventional techniques. For example, in many of the wide range of applications of mobile devices one of the most critical aspects of the mobile-device performance is its battery-life. This applies whether the mobile device is a smart phone or a monitor device, for example a dog collar tracking and monitor device. Concepts and embodiments of the same provide means to substantially overcome or obviate another of the described limitations of conventional techniques for remote access to mobile device content and services, namely the need for tradeoff between battery life of the mobile device and the usability of the access.

Methods and systems according to various exemplary embodiments include a novel combination of optimized ON-OFF power cycling of the mobile device with system synchronization of user accesses to mobile device content, and aspects that render the synchronization substantially transparent to the user. Illustrative factors and considerations for selecting timing parameters of the mobile device ON-OFF power cycling will be described. Such description includes showing, in reference to FIG. 4, an example set of timing parameters for ON-OFF power cycling of a mobile device, and illustrative values for such parameters.

Concepts of synchronizing, according to various substantially user-transparent means, user access to target mobile devices to align with the ON phase of the target mobile devices' ON-OFF power cycling will then be described. One exemplary embodiment provides for this synchronizing by maintaining, for example for each of a plurality of system-registered mobile devices, a database of values of the ON-OFF power cycling timing parameters of the devices. According to various aspects, the one exemplary embodiment can provide alignment of actual access to the target device to the ON phase in the device's ON-OFF power cycling by retrieving, based on the user-input identifier for the target mobile device, the ON-OFF power cycling timing parameters of that target device from the database. Description includes reference to FIG. 5, which shows a high level schematic diagram of one system according to one exemplary embodiment that includes an example of this database of the values of the ON-OFF power cycling timing parameters of system-registered mobile devices.

As will also be described, the exemplary embodiments for providing synchronizing, according to one or substantially user-transparent means, user access to target mobile devices to align with the ON phase of the target mobile devices' ON-OFF power cycling are not limited to maintaining a database of values of the devices' ON-OFF power cycling timing parameters. One alternative embodiment, for example, includes establishing a universe of R available sets of values for ON-OFF power cycling timing and, for each system registered mobile device, identifying which of the R sets of values defines that device's ON-OFF power cycling timing by a pointer. In an aspect, the pointer can be obtained by, for example, applying an arithmetic function, for example a hash function, to an identifier for the mobile device. This example alternative embodiment will be described in greater detail at later sections. One example process flow in a user access according to one or more exemplary embodiments, to a target mobile device employing ON-OFF power cycling is described in reference to FIG. 6.

Regarding the intended meaning in this description of the mobile device being "OFF" and "ON," it will be understood that except in instances, if any, in this description that expressly state otherwise, or instances, if any, where a different meaning is made clear from the context, the intended meanings are: i) the "ON" state of the mobile device is any state in which its radio frequency transceiver (not shown in FIG. 1 or 4) is capable of receiving and transmitting signals and, concurrently, its hosted HTTP web server is capable of performing operations as illustrated by the mobile server 150 operations described in reference to FIG. 3; and ii) the "OFF" state of the mobile device encompasses a range of states at which the power consumption is less, preferably significantly less, than operating in a full state. This includes, without limitation, the power source (i.e., battery or power adapter) being disconnected, and can include a "sleep" or other partial power-down state, for example removal or substantial reduction of power to any one or more power-consuming subsystems of the mobile device. One example partial power-down state is removal or reduction of power to the radio frequency (RF) front end of the mobile device.

Figure 4:
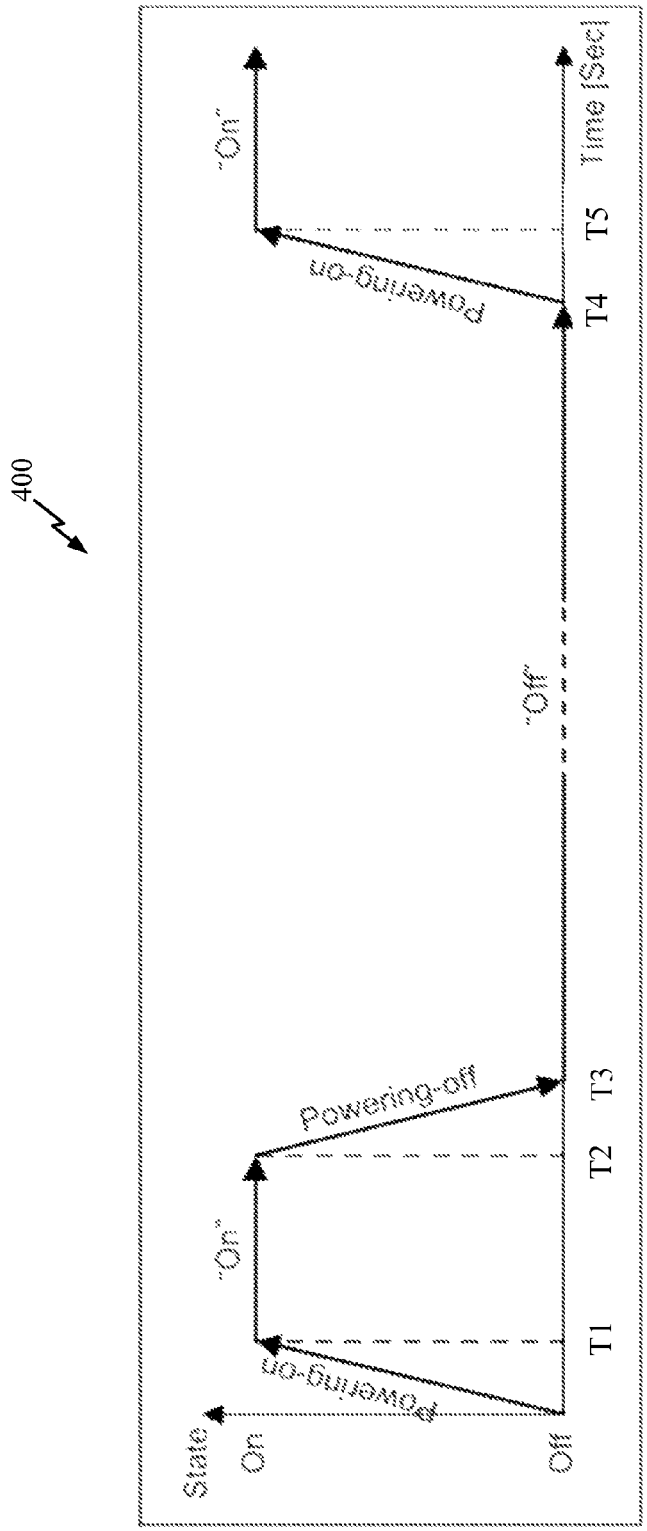
FIG. 4 shows one example duty cycle, as a time versus ON/OFF power state graph, provided by a mobile server device power cycling process according to one exemplary embodiment.

Referring now to FIG. 4, example design considerations for selecting timing parameters of a mobile device ON-OFF power cycling 400, and example values of such timing parameters, will be described.

In the example 400, power-on time is shown as the time spanned from T1, the start of a power-up, to T2, operational steady state. Similarly, an example of a mobile device power-down time is shown as the time spanned from T3, the start of a power-down operation, to T4, where the power-down state is deemed achieved. In one example, mobile device power-on time is assumed as approximately 4 seconds and its power-off time also assumed as approximately 4 seconds. These power-on and power-off times are believed by the inventors to comport with general ranges of power-on and power-off times likely to exhibited by the various mobile devices that may be used in practices according to the exemplary embodiments.

For practices according to one or more exemplary embodiments, target system performance parameters that may be used in selecting specific values for T1, T2, T3 and T4 can be specified. One example of such target system performance parameters can be the maximum waiting time that a user, for example a person at the FIG. 3 Web Client 302, initiating an access of a mobile device, e.g., the FIG. 3 Mobile Device 304 can wait for an initial response. An example of such an initial response can be a location fix, in response to a location request. For convenience in describing example operations this maximum waiting time for an initial response will be arbitrarily referenced as the "maximum Initial Response Wait Time." It will be understood that the name "maximum Initial Response Wait Time" is only an arbitrarily selected name that has no imported meaning, and this selected name places no limitation on the scope of practices in accordance with exemplary embodiments. An example maximum Initial Response Wait Time can be 120 seconds. It will be understood that 120 seconds is only for purposes of illustration, and is not a limitation on practices according to the embodiments.

Continuing with description of example target system performance parameters that may be used in selecting specific values for T1, T2, T3 and T4, another example can be the maximum waiting time for the user to receive a complete response to the user's request for information or services from the Mobile Device 304. One illustrative example may be the maximum time for the user to receive a location fix in response to a location request. For convenience in describing example operations this maximum waiting time for the user to receive a complete response will be arbitrarily referenced as the "maximum Full Response Wait Time." It will be understood that the name "maximum Full Response Wait Time" is only an arbitrarily selected name that has no imported meaning, and that it places no limitation on the scope of practices in accordance with exemplary embodiments. An example maximum Full Response Wait Time can be 180 seconds.

Referring to FIG. 4, example values for the timing parameters T1-T5 that provide system performance meeting the above criteria of a maximum Initial Response Wait Time of 120 seconds, maximum Full Response Time of 180 seconds, and assuming a power-up time and power-down time of 4 seconds, is as follows: T1=4 seconds; T2=24 seconds; T3=28 seconds; T4=138 seconds; T5=142 seconds.

It will be understood that these are example values, chosen as an example of design considerations in implementing systems and methods according to the exemplary embodiments, and for illustrating example operations showing concepts of such embodiments. These values are not intended to limit the scope of any embodiment.

It will be understood that specific values of the times are, in part, a design choice, based factors including anticipated demands of the user(s) and the type of application.

As readily appreciated by persons of ordinary skill in the art from this description, the power conservation provided by the above example ON-OFF cycling of the wireless mobile device/mobile HTTP web server 102 is significant. The example shows a cycle period of 138 seconds. During this period the mobile device is in the "OFF" state for 110 seconds which are (110/138)~80% of the time and is consuming power only for [(4+20+4)/138]~20% of the time. The maximal period between one "ON" phase and another ON phase is (4+110+4)=118 seconds, meaning that the device can offer an initial response in less than 120 seconds.

Further regarding the ON-OFF power cycling, it will be understood that the mobile device can be configured, in practices according to the exemplary embodiments, to suspend and/or restart the cycling in response to certain events. The events can be related to the accessing of the mobile device in the aligned manner in accordance with the present embodiments.

For example, in one aspect suspension and restarting the ON-OFF power cycling can include, in response to receiving a user request during an "ON" period at which a connection is accepted, the ON-OFF power cycle being paused such that the mobile device remains in the "ON" state until all requests from the user are handled.

In a related aspect providing suspension and restarting the ON-OFF power cycling, a mobile device access time-out feature can be provided that, if the target mobile device cannot respond to a user request for a service or status of the target mobile device before expiration of a timeout period, the mobile device sends an indication of the same to the user's client web browser, and restarts the ON-OFF power cycling.

Figure 5:
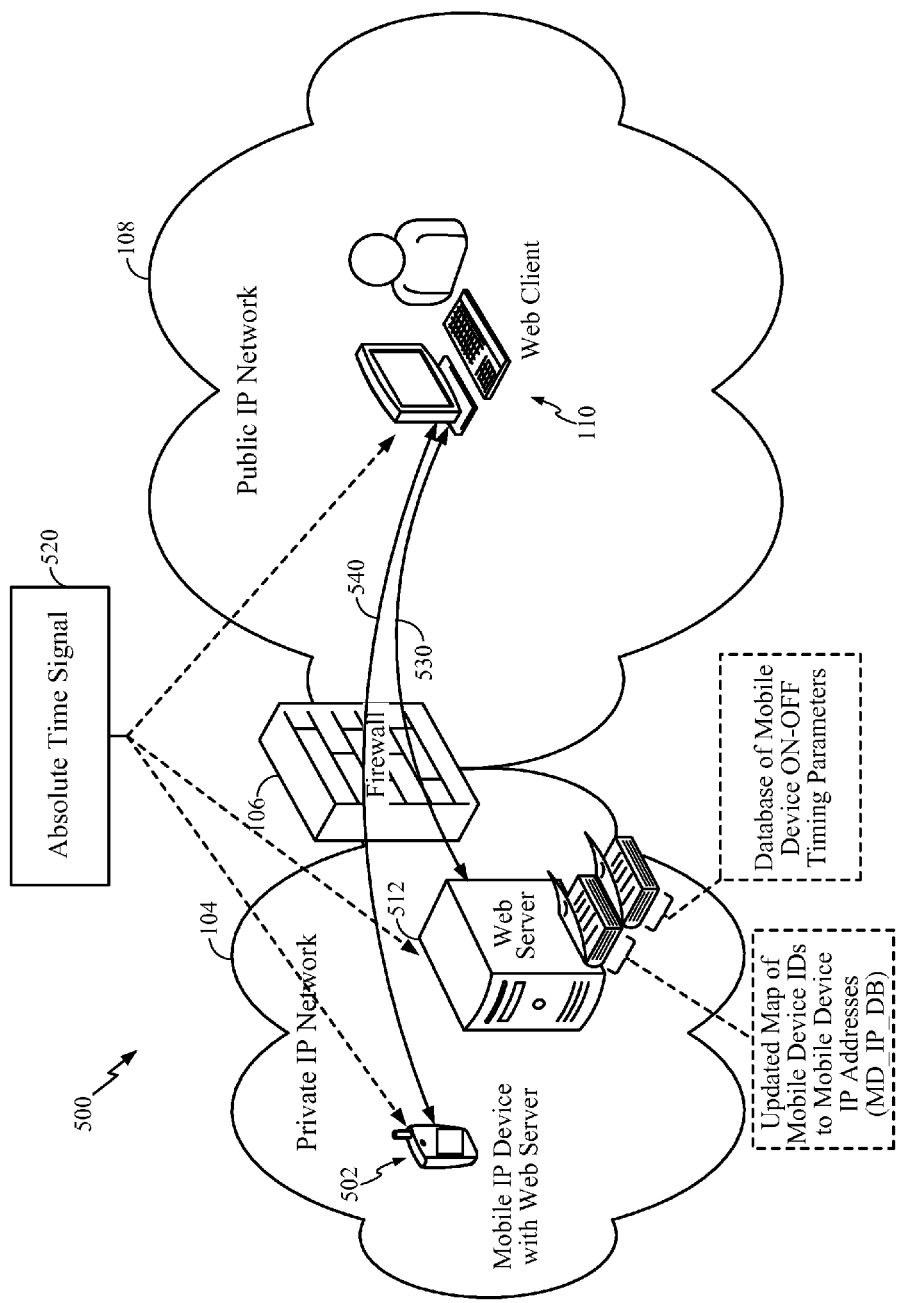
FIG. 5 is a high level schematic diagram of one public web client, inter-network accessible, ON-OFF power cycled mobile server system according to another exemplary embodiment.

FIG. 5 shows a high level schematic diagram of one public web client, inter-network accessible, ON-OFF power cycled mobile server system 500 in accordance with one or more exemplary embodiments. The public web client, inter-network accessible, ON-OFF power cycled mobile server system 500 can provide, among other features, for maintaining in a retrievable manner a database of the timing parameters of the ON-OFF cycle timing for the mobile devices/mobile HTTP web servers, for use in methods of ON-phase aligned client/web browser access according to the exemplary embodiments.

Referring to FIG. 5, the public web client, inter-network accessible, ON-OFF power cycled mobile server system 500 is shown as a modification of the FIG. 1 browser access/mobile web server system 100. It will be understood that the FIG. 5 public web client, inter-network accessible, ON-OFF power cycled mobile server system 500 can therefore provide an environment for practicing synchronized client web browser access to ON-OFF power cycled servers according to one or more exemplary embodiments, in combination with, or merged with browser access/mobile web server systems and methods according to exemplary embodiments described in reference to FIGS. 1 and 3, (as well as FIGS. 2 and 3). However, as will also be understood by persons of ordinary skill in the art from this description, systems and methods can be readily implemented that practice synchronized client web browser access to ON-OFF power cycled servers according to one or more exemplary embodiments, without practicing, and even without providing a capability for practicing exemplary embodiments described in reference to FIGS. 1 and 3, (as well as FIGS. 2 and 3).

Referring to FIG. 5, functional blocks that can be identical to FIG. 1 functional block are given like reference numbers. However, it will be understood that FIG. 5 functional blocks numbered differently from FIG. 1 functional blocks are not necessarily different in function. Instead, as will be understood from the description, some FIG. 5 functional blocks numbered differently from FIG. 1 functional blocks may be identical in logical function, but are numbered differently for purposes of convenience in describing example operations in reference to FIG. 5.

Referring still to FIG. 5, public web client, inter-network accessible, ON-OFF power cycled mobile server system 500 can include one or more wireless mobile device/mobile HTTP web servers including the wireless mobile device/mobile HTTP web server 502. It is assumed that the wireless mobile device/mobile HTTP web server 502 includes all functions of the FIG. 1 wireless mobile device/mobile HTTP web server 102 and its hosted mobile HTTP web server 150, in addition to being configured to receive the Absolute Time Signal 520 and to power up and power down according to a timing parameter set reference herein as "PWR_CYCLE_TIMING(MD_ID)," with the "MD_ID" field of the label reflecting that the PWR_CYCLE_TIMING(MD_ID) can be device-specific, meaning that each MD-ID can have a corresponding PWR_CYCLE_TIMING(MD_ID). The informational content of the PWR_CYCLE_TIMING (MD_ID) data can define power up and power down times as described in reference to FIG. 4, relative to the Absolute Time Signal 520. The format of the PWR_CYCLE_TIMING(MD_ID) data can be, in part, application specific and, in part, a design choice based on the particular implementation of the wireless mobile device/mobile HTTP web server 502.

With continuing reference to FIG. 5, it can be assumed for this example that the Web Server 512 includes all functions of the FIG. 1 Web Server 112 in addition to being configured to receive the Absolute Timing Signal 520 and, further, to maintain a Database of Mobile Device ON-OFF Power Cycle Timings, i.e., the PWR_CYCLE_TIMING_(MD_ID) data for each of the wireless mobile device/mobile HTTP web servers 502. The Database of Mobile Device ON-OFF Power Cycle Timings can, for example, be a modification of the previously described FIG. 1 Web Server 112 MD_IP_DB database of the most recently assigned MD_IP address, for each of the wireless mobile device/mobile HTTP web servers 502. In an aspect, each of the wireless mobile device/mobile HTTP web servers 502 can have a public access identifier such as the previously described public MDAccess_ID, e.g., the previously described ten digit cellular phone number. The Web Server 512 can, in kind, include a mapping of the public MDAccess_ID to the corresponding entry in the Database of Mobile Device ON-OFF Power Cycle Timings (and for the corresponding entry in the MD_IP_DB database having the most recently assigned MD_IP address).

In an example operation, the client/web browser 110 can send, over link 530, an HTTP Connect request (not explicitly shown in FIG. 5) to the Web Server 512 using, as described previously in reference to FIG. 3, a URL of the Web Server 512. The Web Server 512 can respond over link 540 with an HTTP Connected communication, and the communication can continue until as shown in the FIG. 3 example call process 300 until the user enters at 318 the public MDAccess_ID (e.g., "555-123-1234") of the target wireless mobile device/mobile HTTP web server 502. In particular, in addition to retrieving the most recently assigned MD_IP address of the target wireless mobile device/mobile HTTP web server 502, as was described as performed by the FIG. 1 Web Server 112, the Web Server 512 retrieves the PWR_CYCLE_TIMING_ (MD_ID). In an aspect, the Web Server 512 can perform operations according to the exemplary embodiments to synchronize the access requested by the client/web browser 110 with the ON-OFF power cycle timing of the target wireless mobile device/mobile HTTP web server 502. Examples of such operations, illustrating concepts according to the exemplary embodiments, will be described in greater detail in reference to FIG. 6.

Figure 6:
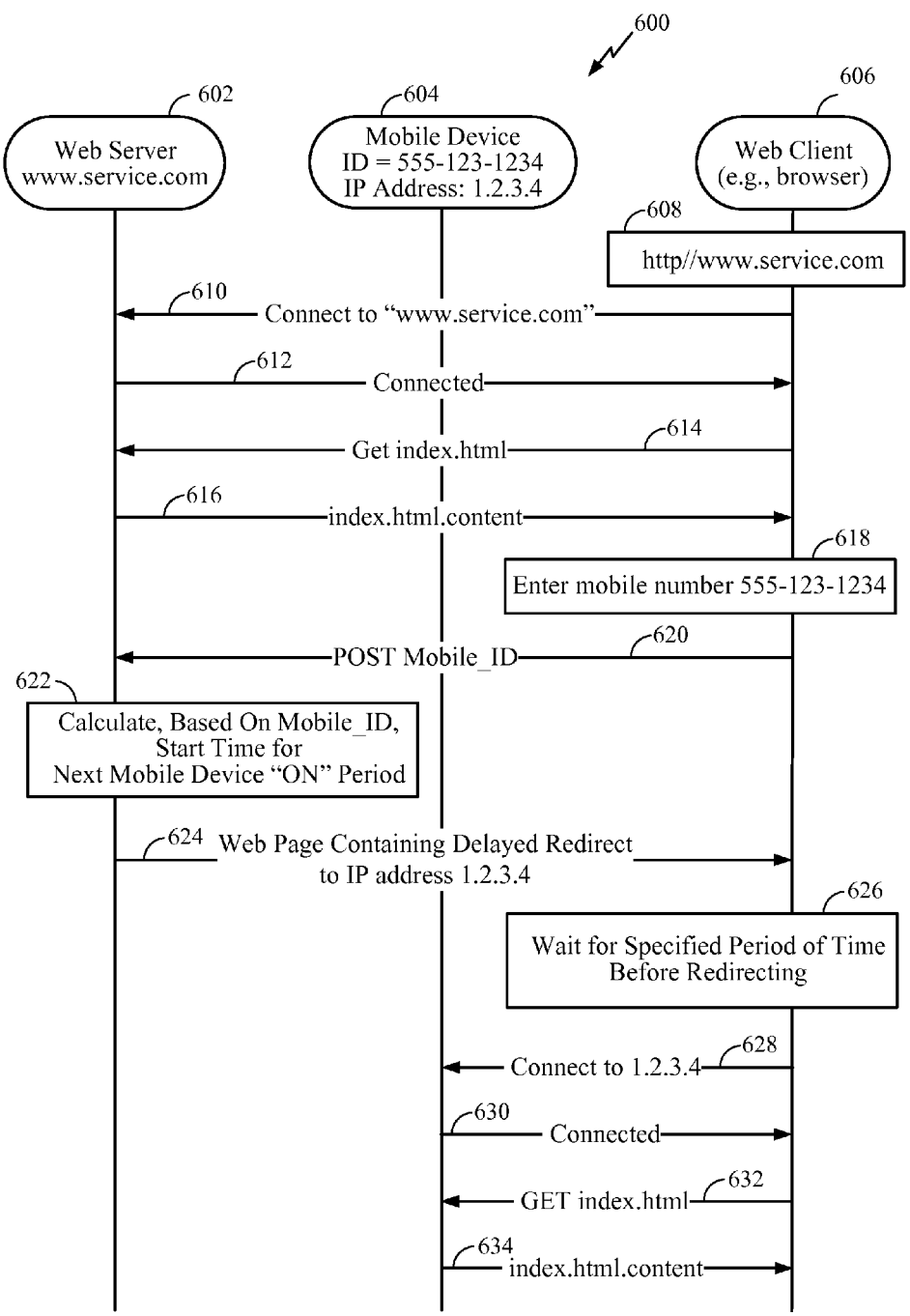
FIG. 6 shows a system call process flow in one method in a public web client access, inter-network, ON-OFF power cycled mobile server system according to another exemplary embodiment.

FIG. 6 shows a system call process flow 600 in one method in a public web client access, inter-network, ON-OFF power cycled mobile server system according to various exemplary embodiments. Operations of the system call process flow 600 will be described in reference to the FIG. 5 public web client, inter-network accessible, ON-OFF power cycled mobile server system 500. As previously described, the FIG. 5 public web client, inter-network accessible, ON-OFF power cycled mobile server system 500 is capable of performing according to embodiments described in reference to FIGS. 1 and 3 (and by moving the location of the Web Server 512, according to FIGS. 2 and 3). However, it will be understood that the FIG. 6 system call process flow 600 can be modified and adapted to perform synchronized access to ON-OFF power cycled servers according to one or more exemplary embodiments for which practice does not necessarily practice embodiments described in reference to FIGS. 1 and 3 (of FIGS. 2 and 3).

Referring to FIG. 6, one example operation of a system call process flow 600 can provide Web Client 606 access to Mobile Device 604 employing, for purposes of redirecting and timing, a Web Server 602. In an example practiced on the FIG. 5 public web client, inter-network accessible, ON-OFF power cycled mobile server system 500, the Web Client 606 can be the FIG. 5 client/web browser 110, the Mobile Device 604 can be the mobile device/mobile HTTP web server 502, and the Web Server 602 can be the Web Server 512. It is assumed that the Web Server 512 implementing the Web Server 602 is configured to store a database having identifiers for each of one or more Mobile Devices 604 and, for each, its most recently assigned IP address (e.g., MD_IP) and its ON-OFF power cycle timing parameter values (e.g., PWR_CYCLE_TIMING_(MD_ID)). It is assumed that the Web Server 512 implementing the Web Server 602 includes a mapping of public identifiers for the Mobile Devices 604 (e.g., the public MDAccess_ID described in reference to FIGS. 1, 2 and 3). It is assumed that this Web Server 602 includes server-side scripting capability to query these databases, to obtain, for example in response to receiving a public MDAccess_ID of a target Mobile Device 604, its most recently assigned IP address (e.g., MD_IP) and its ON-OFF power cycle timing parameter values (e.g., PWR_CYCLE_TIMING_(MD_ID)).

In an example operation of a system call process flow 600, a user of the Web Client 606 can at 608 enter a URL associated with the Web Server 602, for example "www.service.com." At 610 the Web Client 606 can send an HTTP "Connect to www.service.com" communication and, at 612 the Web Server 602 can respond by sending the Web Client 606 an HTTP "Connected" communication. The Web Client 606 can respond by sending, at 614, an HTTP "GET index.html" communication to the Web Server 602. The Web Server 602 can respond at 616 by sending an HTTP "index.html.content" to the Web Client 606. In an aspect, the HTTP "index.html-.content" can include a log-in page or equivalent having a field or other prompt (not shown) for the user to enter the identifier of the target Mobile Device 604. Assuming the identifier for the target Mobile Device 604 is its public MDAccess_ID, and assuming the example MDAccess_ID of "555-123-1234," the user can respond at 618 by entering "555-123-1234" and, for example by hitting a "send" or equivalent command, sending an HTTP "POST Mobile_ID" communication at 620. In this example, the "Mobile_ID" field of the HTTP "POST Mobile_ID" communication will be the public MDAccess_ID, which, further to this example, has the value "555-123-1234."

Referring still to FIG. 6, it will be understood that actions described above as performed by the user can, in an aspect, be replaced by scripts in, for example, the Web Client 606. As illustration, a person of ordinary skill in the art, having view of the present disclosure, can readily configure and install in the Web Client 606 a "hot button" activated Visual Basic (or equivalent) macro to perform the action 608, the communications 610 and 614, and the entering at 618 of the identifier of the target Mobile Device 604.

Continuing to refer FIG. 6, the HTTP "POST Mobile ID" communication sent by the user (e.g., manually or by script) from the Web Client 606 at 620 is received by the Web Server 602. The Web Server 602 then at 622 searches, using the "Mobile_ID" value of the communication, its "Mobile ID" addressable database which, as previously described can have entry for each of one or more Mobile_ID values, the entry having the Mobile_ID's most recently assigned mobile device IP address (e.g., MD_IP values) and mobile device ON-OFF power cycle timing parameter values (e.g.,values of PWR_CYCLE_TIMING_(MD_ID)). Assuming the identifier, (in this example, the Public MDAccess_ID value "555-123-1234,") of the example target Mobile Device 604 has a valid entry in the database, the Web Server 602 search at 622 will obtain the IP address and ON-OFF power cycle timing parameter values most recently assigned to the target Mobile Device 604. The target Mobile Device 604 of this example, namely the target Mobile Device 604 identified by the public MDAccess_ID value "555-123-1234," will be assumed to have a most recently assigned IP address of "1.2.3.4," and to have given ON-OFF power cycle timing parameter values.

Continuing to refer to FIG. 6, after the Web Server 602 search at 622 obtains the target Mobile Device 604 most recently assigned IP address (in this example "1.2.3.4"), and its ON-OFF power cycling timing parameter values, the Web Server 602 performs HTTP redirect communications, according to timings corresponding to the obtained ON-OFF power cycling timing parameter values. As will be further understood from the following description the HTTP redirect communications can, further to one or more exemplary embodiments, coordinate Web Client 606 communication with the target Mobile Device 604 with the "ON phase" of that Mobile Device 604.

Referring still to FIG. 6, in one aspect, the Web Server 602 sends at 624 a web page containing a delayed redirect to the IP address of the Mobile Device 604. The Web page sent at 624 can include, for example, instructions to the Web Client 606 to redirect to the Mobile Device 604 but only at a specified time, where the specified time coincides with the ON phase of the Mobile Device 604. Such an instruction can be implemented by, for example, Web client-side script in the Web page (e.g. JavaScript) or, as another example, by an HTML tag, or by other means. In one implementation, the instruction from the Web Server 602 to the Web Client 606 to redirect to the Mobile Device 604 only at a specified time can specify the time as a delay relative to the time of receiving the instruction, as opposed to an absolute time (e.g., the FIG. 5 Absolute Time 520). As an illustration, the Web Server 602 can be configured to send at 624 instructions to the Web Client 606 to redirect to the Mobile Device 604 in 30 seconds.

Continuing to refer to FIG. 6, and continuing with description of example means for Web Server 602 to instruct the Web Client 606 to redirect to the Mobile Device 604 at a time (based on the Mobile Devices ON-OFF power cycle timing obtained at 622) coincident with the ON phase of the power cycle. As described previously, in one aspect the Web page sent at 624 can, for example, include instructions to the Web Client 606 to redirect to the Mobile Device 604 after a delay relative to the time of receiving the instruction. However, there may be applications that may be unable to tolerate, or adequately account for network delays and execution delays. For example, there may be applications where delays in transferring the page at 624 from the Web Server 602 to the Web Client 606, and/or for the Web Client 606 to render and execute the page may be excessive or unaccountable. In one aspect that can provide for such applications, an absolute time reference (e.g. the Absolute Time Signal 520) that is available to the mobile device, the Web server and the Web browser can be employed. An example of the Absolute Time Signal 520 is UTC (Coordinated Universal Time). UTC is readily available to the Web Server 602, (e.g., using Web server-side scripting languages such as PHP), as well as to the Mobile Device 604 and the Web Client 606 (e.g., using Web client-side scripting languages such as JavaScript). Persons of ordinary skill in the art, based on this disclosure, can readily implement, using Web server-side scripting and client-side scripting languages known to such persons, code to make the UTC or equivalent absolute time available as described and, therefore, further detailed description is omitted.

As will be appreciated by persons of ordinary skill in the art, the above-described aspect of the Web Server 602, Mobile Device 604 and Web Client 606 receiving an absolute time (e.g. UTC) provides the Web Server 602 with the capability to know in advance when is the next "ON" period of the Mobile Device 604, and to instruct the Web Client 606 to redirect accordingly. As will also be appreciated, this provides, among other benefits, tighter control of the time window over which the Web Client 606's redirected HTTP Connect communication is received at the Mobile Device 604. This, in turn, provides among other benefits the ability for a shorter ON phase of the Mobile Device 604 ON-OFF power cycling for further power reduction.

Referring again to FIG. 6, in one operation according to the system call process flow 600, upon the Web Client 606 receiving the Web page sent at 624, the Web Client 606 waits, at 626, until the instructed time (relative or, preferably, absolute). When the instructed time is reached, the Web Client 606 at 628 sends an HTTP Connect communication to the Mobile Device 604 using the IP address of "1.2.3.4." It will be appreciated that the 628 sending of the HTTP Connect communication at the instructed time, especially in the aspect using the absolute time received by the Web Client 606 and the Mobile Device 604 (having its ON-OFF power cycling synched to that absolute time), causes the HTTP Connect communication to arrive at the Mobile Device 604 during its ON phase. This aspect provides, among other features and benefits, that if during the wait time at 626 an impatient or preoccupied user instructs the Web Client 606 to "refresh/reload" the page, the result will be that the Web Server 602 will get another request for the same page. The result, though, would be nothing more than the Web Server 602 being contacted again. The Mobile Device 604 would not be contacted and, therefore, not disturbed during its "OFF" period.

Referring FIG. 6, as described above the Web Client 606 at 628 sends an HTTP Connect communication to the target Mobile Device 604, using the device's most recent IP address, which in this example is "1.2.3.4." With respect to routing of the HTTP Connect communication, further to an aspect the IP address of "1.2.3.4" is routable within the public IP network (for example the FIG. 1 public IP network 108) to the target Mobile Device 604, for example by conventional routing means known to persons of skill in the art. It will be understood that such routing of the HTTP Connect communication sent at 628 can include, referring to FIG. 1, the HTTP Connect communication being received at a firewall, such as the firewall 106, which may then send that communication to the target Mobile Device 604. Continuing, the Mobile Device 604 can respond at 630 with an HTTP Connected communication directly to the Web Client 606. The Web Client 606 at 632 can respond to the HTTP Connected communication sent at 630 by sending an HTTP GET index.com communication to the target Mobile Device 604. The Mobile Device 604 at 634 can respond to the Web Client 606 HTTP GET index.com communication sent at 632 by sending an HTTP index.html.content communication. Subsequent HTTP communications can then occur between the Web Client 606 and the target Mobile Device 604.

As previously described, one alternative embodiment can include assigning ON-OFF power cycling timing to mobile devices to which access is desired (e.g. Mobile Device 604), and subsequently identify the timing of a particular mobile device by applying a hash function to that mobile device's identifier, for example the MD_ID. Further according to the alternative embodiment, a result of the hash function can be used as a pointer or an offset for selecting one of a defined plurality of timings. In one aspect, in applications in which a large number of mobile devices are intended to be accessible, the hash function and its related pointer or offset means can be configured to spread the mobile devices' cycle start time over, for example, 10 seconds. In an aspect, a "hash function" may be picking a digit, for example, the last (least significant) digit of the mobile device identifier (e.g., the last digit of "555-123-1234") as an offset. Further to this aspect, assuming the values of the last digit of the mobile device number are 0 to 9 with a uniformly probability density, a uniformly distributed time spread of 0 to 9 second can be obtained. Applying this to example identifier of "555-123-1234," the offset for the mobile device will be 4 seconds. Practices of exemplary embodiments using the above-described hash function or equivalent spreading, can be readily performed according to the FIG. 6 system call process flow 600, by only modifying or configuring the calculations at 622 to utilize the hash, or equivalent, instead of referring to a database of device-specific ON-OFF power cycle timings.

II. Improved User Experience With Synchronized Web Browser Access to Power-Cycled Mobile Devices Server.

The above-described example operations of the system call process flow 600 include a waiting period at 626, namely waiting for the Mobile Device 604 to switch to the "ON" state. In systems and methods according to one exemplary embodiment, during the waiting period at 626 the Web Client 606 can simply present a fixed display (not shown). However, in certain user environments the user of the Web Client 606 may suspect a system error after seeing the Web browser display will frozen for a period of more than a few seconds.

The exemplary embodiments include various aspects that can reduce the likelihood of users forming a belief that there is a system error.

In one aspect, during the time represented by the FIG. 6 waiting period at 626 the user is provided with a visual indication of a prolonged operation. For example, a progress bar can be displayed, or an emoticon can be displayed. The emoticon may be configured to display, for example, a statement like "Contacting device, this might take some time," together with a progress-bar or other animation of passing time, and the like. Since the waiting period duration is known in advance the user could be provided with a decreasing counter, e.g., a display of: "Please wait. Device will be connected in 34 seconds." In a further aspect, the displayed number, e.g., "34," can be updated repeatedly as time elapses.

In another aspect, during the wait at 626 the user is provided with information showing the last known location of the Mobile Device 604. For example, the Web Server 602 could store the last known position of the Mobile Device 604 and include this with the redirect sent at 624. Alternatively, the Web Client 606 could be configured to store the location history of the Mobile Device 604 obtained from previous operations. In one example according to this aspect the Mobile Device 604 can be set report its position to the Web Server 602 every predefined period (e.g., 2 hours) and the location reported at the last user request is also stored (the latest of both will be used). Using this last known location, in one aspect the user of the Web Client 606 can be provided immediately with a map showing the last known location together with the time it was acquired. This could give the user a general knowledge of the Mobile Device 604 location.

In a related aspect, the Web Client 606 can be configured to interrogate the cellular network carrier (not shown) during the delay 626 for the last cell location of the mobile device. If the cellular network carrier in which the Mobile Device 604 is operated opts to provide such a service, it could provide a way for the Web Client 606 to interrogate it for the last cell-location of the mobile device (e.g. via a Web service interface). This location can be immediately displayed to the user. Given that cellular cells are usually not more than a couple kilometers in radius (at most) this will give an immediate location approximation.

In a further aspect, dynamic selection from among presenting the user with a visual indication of the status, providing the user with the last known location and interrogating the cellular network can be performed, to adaptively provide the user with an optimal experience. For example, when the Web Server 602 constructs at 624 the page that instructs the Web Client 606 to redirect, the Web Server 602 can include different methods from the above as necessary depending on, for example, the wait period. For example, a longer wait period will require several methods of user feedback while a wait period of several seconds might not require any.

In systems and methods according to one exemplary embodiment, after the Mobile Device 604 is accessed, the user can request, through the browser interface of the Web Client 606 the Mobile Device 604 take action to determine its location—if not already known.

In one aspect, after the Mobile Device 604 is contacted the user can request a position location request. In some environments, the Mobile Device 604 may require time to obtain a location fix in response to the location request (e.g. using GPS). In addition, the first attempt might be prolonged since the Mobile Device 604, in accordance with the ON-OFF power cycling of the exemplary embodiments, was just switched on. In methods and systems according to one exemplary embodiment, one or more system feedback aspects can be included to improve, or optimize the user experience during the wait for the Mobile Device 604 to get the location fix. As will be appreciated, some of the feedback aspects may be combined to provide the user with several levels of feedback during the period needed to ascertain the exact mobile device position.

In one feedback aspect, the Mobile Device 604 is configured to store its last known position. The Mobile Device 604, in one example according to this aspect, can be configured to (re)calculate its location every predefined period time to keep it relevant (e.g. 2 hours). In another example according to this aspect, the Mobile Device 604 can be configured to store the location reported to the last user request.

In another feedback aspect the Mobile Device 604 can be configured to respond to a user request for its location by immediately sending the last known location, stored as described above, to the user with a map showing that last known location together with the time it was acquired. This could give the user a general knowledge of the device location.

In another feedback aspect, the Mobile Device 604 can be configured such that even before fulfilling the position location request (e.g. using GPS) it will very quickly acquire the cellular network and therefore could provide the cellular cell identifier, e.g., the Cell ID. In a further aspect, the Mobile Device 604 can be configured such that, when operating in a cellular network that includes the cellular cell location coordinates at the data provided by each cell, the location data is immediately sent to the Web Client 606 can there can be immediately displayed to the user. In another aspect, the Mobile Device 604 can be configured so that, when operating in a cellular network that only provides the Cell ID, it sends the Cell ID to the Web Client 606 and, in combination the Web Client 606 can be configured to respond by issuing a request programmatically (e.g., using a Web client-side script) to lookup the Cell ID in an Internet database that can be queried using the HTTP protocol, and to display the result. Persons of ordinary skill in the art can, based on the present disclosure, readily construct Web client-side script to perform a query and display and, therefore, further detailed description is omitted.

In another system feedback aspect, the Mobile Device 604 can be configured, if capable of operating in a Wi-Fi system, to look for Wi-Fi network reception and, using the IDs of such Wi-Fi networks, convert the IDs into coordinates using specific databases that could be queried programmatically (e.g. using a Web client-side script). Persons of ordinary skill in the art can, based on the present disclosure, readily construct Web client-side script to perform such Wi-Fi ID query and display and, therefore, further detailed description is omitted.

In systems and methods according to one exemplary embodiment, the Web Client 606, and or the Mobile Device 604 can be configured notify the user immediately of the Mobile Device 604 position location immediately upon it being determined (e.g., successful GPS session ends). According to various aspects, such notification can be sent to the user automatically, without requiring a manual "refresh," and very quickly.

In one of these aspects, immediate notification can be provided by configuring the Web Client 606 to programmatically reload the Mobile Device 604 Web page, for example at every specified interval (e.g., 5 seconds) irrespective of having a fix of the location. Persons of ordinary skill in the art can, based on the present disclosure, readily construct Web client-side script to perform such Web page reloading and, therefore, further detailed description is omitted.

In another aspect, benefits of the above-described programmatic reloading of the Web page can be obtained and, further, benefits such as of improved battery life in the Mobile Device 604 can be obtained. This aspect makes accommodation for, and exploits for purposes of extending battery life, the fact that a typical location fix can take, for example, approximately 50 seconds. The result is that the above-described Web page refresh, if performed at an interval of, for example 5 seconds, will likely waste the first 9 Web page refresh requests (at times t=5, 10, 15, 20, 25, 30, 35, 40 & 45 seconds). Only the last Web page refresh request (at time t=50) will be answered with the position data. According to an aspect, the Mobile Device 604 can be configured to estimate the time it might take to fulfill the location fix request, and to send the Web Client 606 a Web page that will refresh only at that time. For example, the Mobile Device 604 can be configured such that, if the estimated time to fulfill a location fix request is 50 seconds, the Web page could constructed such that (e.g. using a Web client-side script) it can be refreshed only after 50 seconds. The configuration can include the Web page being capable of being refreshed thereafter every 5 seconds until a result is acquired. As to the specific waiting time before the Web page will be first refreshed, it appreciated from this description that an optimal point between user-experience and power-consumption can be easily found.

In another aspect, the Mobile Device (i.e., the FIG. 5 wireless mobile device/mobile HTTP web server 502) can be configured such that it halts its ON-OFF power cycling when handing a user request and will not resume the ON-OFF power cycling until the user request is finished.

In a further aspect, other standard Web mechanisms can be used, e.g., "Long Polling", "XMLHttpRequest", HTML5 WebSockets, and the like. Examples can be http://en.wikipedia.org/wiki/Push$_{13}$technology and http://en.wikipedia.org/wiki/Comet_%28programming %29.

FIG. 7 is a high level functional block diagram of one mobile device/server 700 that can implement a FIG. 1 wireless mobile device/mobile HTTP web server 102 hosting the mobile web site 150 and, therefore, any one or more of the FIG. 3 Mobile Device(s) 304 or the FIG. 5 wireless mobile device/mobile HTTP web server(s) 502, for practices in accordance with various exemplary embodiments. It will be understood that the FIG. 5 high level functional block diagram is a graphical representation of logical functions that can be included in the mobile device/server 500, and is not intended to be any limit on the scope of the hardware architectures or arrangements that may be used in practices according to the various exemplary embodiments.

Referring to FIG. 7 the mobile device/server 700 can include a processing core 702 having an attribute store 7022 and an operation handler 7024. In an aspect, mobile device/server 700 can include a Web Server 704 capable of and configured to support a server-side scripting engine 706. In an aspect, the server-side scripting engine 706 can be configured to provide, and invoke the operation handler 7024. As shown, the server-side scripting engine 706 can set, as well as retrieving or extracting attributes from the attribute store 7022. In a further aspect, the mobile device/server 700 can include an HTML repository 708. In an aspect, the mobile device/server 700 can include a wireless transmitter/receiver 710 for communicating with the FIG. 1, the Web server 112 and, in an aspect, the firewall 106. The wireless transmitter/receiver 710 can support, for example, IEEE 802.11 protocol communications. In a further aspect, the mobile device/server 700 can include a cellular wireless network interface (not shown in FIG. 7). In an aspect, the mobile device/server 700 can include an MD_IP update module 712, for example an application provided in the processing core, for performing dynamic address update reporting such as described in reference to FIG. 2

With respect to the hardware implementation of the processing core 702, those skilled in the art will appreciate that the processing tasks can be assigned to any processor or computational engine capable of executing instructions. The processing function can be centralized in one location, or distributed among a plurality of processors or processing locations, without departing from the spirit and scope of the disclosed aspects.

Persons of ordinary skill in the art will appreciate, from reading the present disclosure, that among the various benefits of systems and methods according to one or more exemplary embodiments is the providing to users having no more than a conventional computing device hosting a conventional browser, connected to the Internet by conventional techniques, with a ready access to content of another user's mobile device. In one or more aspects, accessing users can be members of the public and the mobile device can belong to a user that, through configuration of a mobile web site hosted on the user's mobile device, wishes to make selected content readily available to the public. Further among the various benefits that will be appreciated by persons of ordinary skill in the art from the present disclosure is the providing of remote, secure, practical administration of the user's mobile device.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Means for performing any of the techniques described herein can include one or more of a processor, a memory, a network interface, etc., which may include general and/or specialized hardware and/or software components.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an embodiment of the invention can include a computer readable media embodying a method as claimed in the claims. Accordingly, the invention is not limited to illustrated examples and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method for reduced power consumption access to mobile device content, comprising:
assigning an assigned ON-OFF power cycle timing of the mobile device, wherein the assigning includes associating the assigned ON-OFF power cycle timing of the mobile device with a mobile device identifier that identifies the mobile device;
receiving a HyperText Transfer Protocol request from a web client for access to a content of the mobile device, the HyperText Transfer Protocol request including the mobile device identifier;
obtaining, based on the mobile device identifier, an obtained ON-OFF power cycle timing of the mobile device, the obtained ON-OFF power cycle timing of the mobile device being the assigned ON-OFF power cycle timing; and
controlling web-client access requested by the HyperText Transfer Protocol request to the mobile device based, at least in part, on the obtained ON-OFF power cycle timing of the mobile device, wherein controlling web-client access includes sending, to the web client, an instruction having a direct address for accessing the mobile device directly.

2. The method for reduced power consumption access to mobile device content of claim 1, further comprising storing the assigned ON-OFF power cycle timing of the mobile device in a database to be retrievable based on the mobile device identifier of the mobile device.

3. The method for reduced power consumption access to mobile device content of claim 2, wherein obtaining the ON-OFF power cycle timing of the mobile device includes querying the database, using the mobile device identifier of the mobile device.

4. The method for reduced power consumption access to mobile device content of claim 3, wherein receiving the HyperText Transfer Protocol request from the web client is at a web server, and wherein the method further comprises:
receiving an absolute time signal, the receiving being at the web server and at the web client and at the mobile device, wherein controlling web-client access includes:
sending from the web server to the web client an instruction for performing the accessing at a time schedule, relative to the absolute time signal, based on the obtained ON-OFF power cycle timing of the mobile device.

5. The method for reduced power consumption access to mobile device content of claim 1, wherein assigning the assigned ON-OFF power cycle timing of the mobile device, includes selecting, based on an arithmetic function of the identifier of the mobile device, a time schedule among a given plurality of time schedules, and assigning said time schedule as the assigned ON-OFF power cycle timing of the mobile device.

6. The method for reduced power consumption access to mobile device content of claim 5, wherein obtaining the obtained ON-OFF power cycle timing of the mobile device includes applying said arithmetic function to the mobile device identifier of the mobile device.

7. The method for reduced power consumption access to mobile device content of claim 6, wherein receiving the HyperText Transfer Protocol request from the web client is at a web server, and wherein the obtained ON-OFF power cycle timing of the mobile device is based on a result of the applying said arithmetic function to the identifier of the mobile device, and wherein controlling web-client access includes:
sending from the web server to the web client the instruction having the direct address for accessing the mobile device and an instruction for performing the accessing at a time schedule based on the obtained ON-OFF power cycle timing relative to an absolute time signal.

8. The method for reduced power consumption access to mobile device content of claim 1, wherein receiving the HyperText Transfer Protocol request from the web client is at a web server, and wherein controlling web-client access includes:
sending from the web server to the web client an instruction for performing the accessing at a time schedule based on the obtained ON-OFF power cycle timing of the mobile device.

9. The method for reduced power consumption access to mobile device content of claim 8, wherein controlling web-client access includes sending an access request pending indicator from the web server to the web client, said sending being anywhere in a time interval beginning at the sending of the instruction for performing the accessing and ending at a time based on the obtained ON-OFF power cycle timing of the mobile device.

10. The method for reduced power consumption access to mobile device content of claim 1 for accessing a web site on a mobile device, further comprising:
maintaining a database associating the mobile device identifier with an assigned IP address; and
performing, based on the mobile device identifier in the HyperText Transfer Protocol request, a query of said database associating the mobile device identifier with the assigned IP address, to obtain the assigned IP address, and
wherein controlling web-client access requested by the HyperText Transfer Protocol request to the mobile device includes sending the web client a HyperText Transfer Protocol redirect request, the HyperText Transfer Protocol re-direct request including the assigned IP address.

11. A method for reduced power consumption access to mobile device content, comprising:
receiving at a web client an absolute time signal;
sending a HyperText Transfer Protocol connect request from the web client to a web server, for web client access to a content of a mobile device, the HyperText Transfer Protocol connect request including a mobile device identifier identifying the mobile device;
receiving at the web client, from the web server, an instruction to redirect to an IP address associated with the mobile device, wherein the redirect is at a specific time relative to the absolute time signal; and
sending a HyperText Transfer Protocol redirect from the web client to the mobile device in accordance with the specific time.

12. The method for reduced power consumption access to mobile device content of claim 11, further comprising:

receiving at the web client an access request pending indicator from the web server, said receiving being anywhere in a time interval beginning at the receiving of the instruction to redirect at the specific time ending at a time based on the specific time; and displaying at the web client a visual status indicator based on the access request pending indicator.

13. The method for reduced power consumption access to mobile device content of claim 11, further comprising:

starting a connection time-out timer in association with the sending the HyperText Transfer Protocol redirect; and in response to the connection time-out timer reaching a time-out value prior to receiving at the web client an HyperText Transfer Protocol connected communication corresponding to the HyperText Transfer Protocol redirect, performing a query of an information source having a last reported location of the mobile device, and displaying a result of the query.

14. The method for reduced power consumption access to mobile device content of claim 11, further comprising:

starting a connection time-out timer in association with the sending the HyperText Transfer Protocol redirect; and in response to the connection time-out timer reaching a time-out value prior to receiving at the web client a HyperText Transfer Protocol connected communication corresponding to the HyperText Transfer Protocol redirect, performing an interrogation of a cellular network associated with the mobile device for a last detected cell site location of the mobile device, and displaying a result of the interrogation.

15. The method for reduced power consumption access to mobile device content of claim 11, further comprising, receiving at the web client a HyperText Transfer Protocol connected communication corresponding to the HyperText Transfer Protocol redirect;

sending from the web client to the mobile device a request for a mobile device location fix;

starting a location fix time-out timer in association with the sending to the mobile device the request for the mobile device location fix; and in response to the location fix time-out timer reaching a time-out value prior to receiving at the web client the mobile device location fix corresponding to the request for the mobile device location fix, performing an interrogation of a cellular network associated with the mobile device for a current detected cell site location of the mobile device, and displaying a result of the interrogation.

16. A non-transitory computer-readable medium comprising instructions, which, when executed by a processor in a wireless communications system, cause the processor to perform a method of reduced power consumption access to mobile device content, wherein the instructions comprise:

instructions that cause a processor to assign an assigned ON-OFF power cycle timing of the mobile device, and to associate the assigned ON-OFF power cycle timing of the mobile device with a mobile device identifier that identifies the mobile device;

instructions that cause a processor to receive a HyperText Transfer Protocol request from a web client for access to a content of the mobile device, the HyperText Transfer Protocol request including the mobile device identifier;

instructions that cause a processor to obtain, based on the mobile device identifier, an obtained ON-OFF power cycle timing of the mobile device, the obtained ON-OFF power cycle timing of the mobile device being the assigned ON-OFF power cycle timing; and instructions that cause a processor to control web-client access requested by the HyperText Transfer Protocol request to the mobile device based, at least in part, on the obtained ON-OFF power cycle timing of the mobile device, wherein controlling web-client access includes sending, to the web client, an instruction having a direct address for accessing the mobile device directly.

17. A non-transitory computer-readable medium comprising instructions, which, when executed by a processor in a wireless communications system, cause the processor to perform a method of reduced power consumption access to mobile device content, wherein the instructions comprise:

instructions that cause a processor to receive at a web client an absolute time signal;

instructions that cause a processor to send a HyperText Transfer Protocol connect request from the web client to a web server, for web client access to a content of the mobile device, the HyperText Transfer Protocol connect request including a mobile device identifier that identifies the mobile device;

instructions that cause a processor to receive at the web client, from the web server, an instruction to redirect at a specific time relative to the absolute time signal to an IP address associated with the mobile device; and instructions that cause a processor to send a HyperText Transfer Protocol redirect from the web client to the mobile device in accordance with the specific time.

18. The computer-readable medium of claim 17, wherein the instructions further comprise:

instructions that cause a processor to receive at the web client an access request pending indicator from the web server, said receiving being anywhere in a time interval, wherein the time interval begins at the receiving of the instruction to redirect at the specific time and ends at a time based on the specific time; and instructions that cause a processor to display at the web client a visual status indicator based on the access request pending indicator.

19. The computer-readable medium of claim 17, wherein the instructions further comprise:

instructions that cause a processor to start a connection time-out timer in association with the sending the HyperText Transfer Protocol redirect; and instructions that cause a processor, in response to the connection time-out timer reaching a time-out value prior to receiving at the web client a HyperText Transfer Protocol connected communication corresponding to the HyperText Transfer Protocol redirect, to perform a query of an information source having a last reported location of the mobile device, and display a result of the query.

20. An apparatus for providing reduced power consumption access to mobile device content, the apparatus comprising:

a network interface;

a processor communicatively coupled with the network interface; and a memory communicatively coupled with the processor and having instructions which, when executed by the processor, cause the apparatus to:

assign an assigned ON-OFF power cycle timing of the mobile device, wherein the assigning includes associating the assigned ON-OFF power cycle timing of the mobile device with a mobile device identifier that identifies the mobile device;

receive a HyperText Transfer Protocol request from a web client for access to a content of the mobile device, the HyperText Transfer Protocol request including the mobile device identifier;

obtain, based on the mobile device identifier, an obtained ON-OFF power cycle timing of the mobile device, the obtained ON-OFF power cycle timing of the mobile device being the assigned ON-OFF power cycle timing; and control web-client access requested by the HyperText Transfer Protocol request to the mobile device based, at least in part, on the obtained ON-OFF power cycle timing of the mobile device, wherein controlling web-client access includes sending, to the web client, an instruction having a direct address for accessing the mobile device directly.

21. The apparatus for providing reduced power consumption access to mobile device content of claim 20, wherein the instructions which, when executed by the processor, further cause the apparatus to store the assigned ON-OFF power cycle timing of the mobile device in a database to be retrievable based on the mobile device identifier of the mobile device.

22. The apparatus for providing reduced power consumption access to mobile device content of claim 21, wherein obtaining the ON-OFF power cycle timing of the mobile device includes querying the database, using the mobile device identifier of the mobile device.

23. The apparatus for providing reduced power consumption access to mobile device content of claim 22, wherein the apparatus is a web server, and wherein the instructions which, when executed by the processor, further cause the apparatus to:

receive an absolute time signal, the receiving being at the web server and at the web client and at the mobile device, wherein controlling web-client access includes:
sending from the web server to the web client an instruction for performing the accessing at a time schedule, relative to the absolute time signal, based on the obtained ON-OFF power cycle timing of the mobile device.

24. The apparatus for providing reduced power consumption access to mobile device content of claim 20, wherein assigning the assigned ON-OFF power cycle timing of the mobile device, includes selecting, based on an arithmetic function of the identifier of the mobile device, a time schedule among a given plurality of time schedules, and assigning said time schedule as the assigned ON-OFF power cycle timing of the mobile device.

25. The apparatus for providing reduced power consumption access to mobile device content of claim 24, wherein obtaining the obtained ON-OFF power cycle timing of the mobile device includes applying said arithmetic function to the mobile device identifier of the mobile device.

26. The apparatus for providing reduced power consumption access to mobile device content of claim 25, wherein the apparatus is a web server, and wherein the obtained ON-OFF power cycle timing of the mobile device is based on a result of the applying said arithmetic function to the identifier of the mobile device, and wherein controlling web-client access includes:
sending from the web server to the web client, via the network interface, the instruction having the direct address for accessing the mobile device and an instruction for performing the accessing at a time schedule based on the obtained ON-OFF power cycle timing relative to an absolute time signal.

27. The apparatus for providing reduced power consumption access to mobile device content of claim 20, wherein the apparatus is a web server, and wherein controlling web-client access includes:
sending from the web server to the web client, via the network interface, an instruction for performing the accessing at a time schedule based on the obtained ON-OFF power cycle timing of the mobile device.

28. The apparatus for providing reduced power consumption access to mobile device content of claim 27, wherein controlling web-client access includes sending an access request pending indicator from the web server to the web client via the network interface, said sending being anywhere in a time interval beginning at the sending of the instruction for performing the accessing and ending at a time based on the obtained ON-OFF power cycle timing of the mobile device.

29. The apparatus for providing reduced power consumption access to mobile device content of claim 20, wherein the instructions which, when executed by the processor, further cause the apparatus to:

maintain a database associating the mobile device identifier with an assigned IP address; and
perform, based on the mobile device identifier in the HyperText Transfer Protocol request, a query of said database associating the mobile device identifier with the assigned IP address, to obtain the assigned IP address, and
wherein controlling web-client access requested by the HyperText Transfer Protocol request to the mobile device includes sending the web client a HyperText Transfer Protocol re-direct request, the HyperText Transfer Protocol re-direct request including the assigned IP address.

30. An apparatus for providing reduced power consumption access to mobile device content, the apparatus comprising:

a network interface;
a processor communicatively coupled with the network interface; and
a memory communicatively coupled with the processor and having instructions which, when executed by the processor, cause the apparatus to:
receive at a web client an absolute time signal;
send, via the network interface, a HyperText Transfer Protocol connect request from the web client to a web server, for web client access to a content of a mobile device, the HyperText Transfer Protocol connect request including a mobile device identifier identifying the mobile device;
receive from the web server, via the network interface, an instruction to redirect to an IP address associated with the mobile device, wherein the redirect is at a specific time relative to the absolute time signal; and
send a HyperText Transfer Protocol redirect from the web client to the mobile device in accordance with the specific time.

31. The apparatus for providing reduced power consumption access to mobile device content of claim 30, wherein the instructions which, when executed by the processor, further cause the apparatus to:

receive, via the network interface, an access request pending indicator from the web server, said receiving being anywhere in a time interval beginning at the receiving of the instruction to redirect at the specific time ending at a time based on the specific time; and
display, at the web client, a visual status indicator based on the access request pending indicator.

32. The apparatus for providing reduced power consumption access to mobile device content of claim 30, wherein the instructions which, when executed by the processor, further cause the apparatus to:
  start a connection time-out timer in association with the sending the HyperText Transfer Protocol redirect; and
  in response to the connection time-out timer reaching a time-out value prior to receiving at the web client a HyperText Transfer Protocol connected communication corresponding to the HyperText Transfer Protocol redirect, perform a query of an information source having a last reported location of the mobile device, and display a result of the query.

33. The apparatus for providing reduced power consumption access to mobile device content of claim 30, wherein the instructions which, when executed by the processor, further cause the apparatus to:
  start a connection time-out timer in association with the sending the HyperText Transfer Protocol redirect; and
  in response to the connection time-out timer reaching a time-out value prior to receiving at the web client a HyperText Transfer Protocol connected communication corresponding to the HyperText Transfer Protocol redirect, perform an interrogation of a cellular network associated with the mobile device for a last detected cell site location of the mobile device, and display a result of the interrogation.

34. The apparatus for providing reduced power consumption access to mobile device content of claim 30, wherein the instructions which, when executed by the processor, further cause the apparatus to:
  receive at the web client a HyperText Transfer Protocol connected communication corresponding to the HyperText Transfer Protocol redirect;
  send from the web client to the mobile device a request for a mobile device location fix;
  start a location fix time-out timer in association with the sending to the mobile device the request for the mobile device location fix; and
  in response to the location fix time-out timer reaching a time-out value prior to receiving at the web client the mobile device location fix corresponding to the request for the mobile device location fix, perform an interrogation of a cellular network associated with the mobile device for a current detected cell site location of the mobile device, and display a result of the interrogation.

35. A system for reduced power consumption access to mobile device content, comprising:
  means for assigning an assigned ON-OFF power cycle timing of the mobile device, wherein the means for assigning includes means for associating the assigned ON-OFF power cycle timing of the mobile device with a mobile device identifier that identifies the mobile device;
  means for receiving a HyperText Transfer Protocol request from a web client for access to a content of the mobile device, the HyperText Transfer Protocol request including the mobile device identifier;
  means for obtaining, based on the mobile device identifier, an obtained ON-OFF power cycle timing of the mobile device, the obtained ON-OFF power cycle timing of the mobile device being the assigned ON-OFF power cycle timing; and
  means for controlling web-client access requested by the HyperText Transfer Protocol request to the mobile device based, at least in part, on the obtained ON-OFF power cycle timing of the mobile device, wherein the means for controlling web-client access include means for sending, to the web client, an instruction having a direct address for accessing the mobile device directly.

36. The system for reduced power consumption access to mobile device content of claim 35, further comprising means for storing the assigned ON-OFF power cycle timing of the mobile device in a database to be retrievable based on the mobile device identifier of the mobile device.

37. The system for reduced power consumption access to mobile device content of claim 36, wherein the means for obtaining the ON-OFF power cycle timing of the mobile device includes means for querying the database, using the mobile device identifier of the mobile device.

38. The system for reduced power consumption access to mobile device content of claim 37, wherein the means for receiving the HyperText Transfer Protocol request from the web client is at a web server, and wherein the system further comprises:
  means for receiving an absolute time signal, the receiving being at the web server and at the web client and at the mobile device, wherein controlling web-client access includes:
  means for sending from the web server to the web client an instruction for performing the accessing at a time schedule, relative to the absolute time signal, based on the obtained ON-OFF power cycle timing of the mobile device.

39. A system for reduced power consumption access to mobile device content, comprising:
  means for receiving at a web client an absolute time signal;
  means for sending a HyperText Transfer Protocol connect request from the web client to a web server, for web client access to a content of a mobile device, the HyperText Transfer Protocol connect request including a mobile device identifier identifying the mobile device;
  means for receiving at the web client, from the web server, an instruction to redirect to an IP address associated with the mobile device, wherein the redirect is at a specific time relative to the absolute time signal; and
  means for sending a HyperText Transfer Protocol redirect from the web client to the mobile device in accordance with the specific time.

40. The system for reduced power consumption access to mobile device content of claim 39, further comprising:
  means for receiving at the web client an access request pending indicator from the web server, said receiving being anywhere in a time interval beginning at the receiving of the instruction to redirect at the specific time ending at a time based on the specific time; and
  means for displaying at the web client a visual status indicator based on the access request pending indicator.

41. The system for reduced power consumption access to mobile device content of claim 39, further comprising:
  means for starting a connection time-out timer in association with the sending the HyperText Transfer Protocol redirect; and
  means for, in response to the connection time-out timer reaching a time-out value prior to receiving at the web client an HyperText Transfer Protocol connected communication corresponding to the HyperText Transfer Protocol redirect, performing a query of an information source having a last reported location of the mobile device, and displaying a result of the query.

* * * * *